United States Patent
Farrell et al.

(10) Patent No.: US 10,768,832 B2
(45) Date of Patent: *Sep. 8, 2020

(54) MANAGING STORAGE PROTECTION FAULTS

(71) Applicant: INTERNATIONAL BUSINESS MACHINES CORPORATION, Armonk, NY (US)

(72) Inventors: Mark S. Farrell, Pleasant Valley, NY (US); Lisa Cranton Heller, Rhinebeck, NY (US); Damian L. Osisek, Vestal, NY (US); Peter K. Szwed, Rhinebeck, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/282,567

(22) Filed: Feb. 22, 2019

(65) Prior Publication Data

US 2019/0212931 A1 Jul. 11, 2019

Related U.S. Application Data

(63) Continuation of application No. 15/966,974, filed on Apr. 30, 2018, now Pat. No. 10,223,015, which is a (Continued)

(51) Int. Cl.
*G06F 12/00* (2006.01)
*G06F 3/06* (2006.01)
(Continued)

(52) U.S. Cl.
CPC .......... *G06F 3/0622* (2013.01); *G06F 3/0637* (2013.01); *G06F 3/0673* (2013.01);
(Continued)

(58) Field of Classification Search
CPC ..... G06F 3/0622; G06F 3/0637; G06F 3/0673
See application file for complete search history.

(56) References Cited

U.S. PATENT DOCUMENTS 4,779,188 A 10/1988 Gum et al.
5,551,013 A 8/1996 Beausoleil et al.
(Continued)

FOREIGN PATENT DOCUMENTS

JP S63228352 A 9/1988
JP H05165663 A 7/1993
(Continued)

OTHER PUBLICATIONS

"Z/VM—Running Guest Operating Systems," International Business Machines Corporation, SC24-5997-02, Third Edition, May 2002, pp. 1-172.
(Continued)

*Primary Examiner* — Gurtej Bansal
(74) *Attorney, Agent, or Firm* — Steven Chiu, Esq.; Blanche E. Schiller, Esq.; Heslin Rothenberg Farley & Mesiti P.C.

(57) ABSTRACT

Management of storage used by pageable guests of a computing environment is facilitated. A query instruction is provided that details information regarding the storage location indicated in the query. It specifies whether the storage location, if protected, is protected by host-level protection or guest-level protection.

20 Claims, 10 Drawing Sheets

Related U.S. Application Data continuation of application No. 15/638,553, filed on Jun. 30, 2017, now Pat. No. 9,971,533, which is a continuation of application No. 15/401,765, filed on Jan. 9, 2017, now Pat. No. 9,778,869, which is a continuation of application No. 14/840,565, filed on Aug. 31, 2015, now Pat. No. 9,542,260, which is a continuation of application No. 14/570,724, filed on Dec. 15, 2014, now Pat. No. 9,122,634, which is a continuation of application No. 14/105,337, filed on Dec. 13, 2013, now Pat. No. 8,972,670, which is a continuation of application No. 13/749,001, filed on Jan. 24, 2013, now Pat. No. 8,677,077, which is a continuation of application No. 13/283,171, filed on Oct. 27, 2011, now Pat. No. 8,364,912, which is a continuation of application No. 12/052,683, filed on Mar. 20, 2008, now Pat. No. 8,176,280.

(60) Provisional application No. 61/031,160, filed on Feb. 25, 2008.

(51) Int. Cl.
  *G06F 11/07* (2006.01)
  *G06F 12/14* (2006.01)
  *G06F 12/1009* (2016.01)
  *G06F 12/109* (2016.01)

(52) U.S. Cl.
  CPC .......... *G06F 11/073* (2013.01); *G06F 11/079* (2013.01); *G06F 11/0712* (2013.01); *G06F 11/0727* (2013.01); *G06F 11/0751* (2013.01); *G06F 11/0793* (2013.01); *G06F 12/1009* (2013.01); *G06F 12/1408* (2013.01); *G06F 12/1458* (2013.01); *G06F 12/1491* (2013.01); *G06F 12/109* (2013.01); *G06F 12/145* (2013.01); *G06F 12/1475* (2013.01); *G06F 12/1483* (2013.01); *G06F 2212/151* (2013.01); *G06F 2212/654* (2013.01); *G06F 2212/657* (2013.01)

(56) References Cited

U.S. PATENT DOCUMENTS

| | | | |
|---|---|---|---|
| 5,574,873 A | 11/1996 | Davidian | |
| 5,574,936 A | 11/1996 | Ryba et al. | |
| 5,613,086 A | 3/1997 | Frey et al. | |
| 5,790,825 A | 8/1998 | Traut | |
| 5,946,484 A | 8/1999 | Brandes | |
| 6,009,261 A | 12/1999 | Scalzi et al. | |
| 6,308,255 B1 | 10/2001 | Gorishek, IV et al. | |
| 6,463,582 B1 | 10/2002 | Lethin et al. | |
| 6,789,156 B1 * | 9/2004 | Waldspurger | G06F 12/1018 711/6 |
| 7,089,377 B1 | 8/2006 | Chen | |
| 7,111,145 B1 * | 9/2006 | Chen | G06F 12/1036 711/206 |
| 7,197,582 B2 | 3/2007 | Chelcea et al. | |
| 7,197,585 B2 | 3/2007 | Farrell et al. | |
| 8,176,279 B2 | 5/2012 | Farrell et al. | |
| 8,176,280 B2 | 5/2012 | Farrell et al. | |
| 8,364,912 B2 | 1/2013 | Farrell et al. | |
| 8,417,916 B2 | 4/2013 | Greiner et al. | |
| 8,677,077 B2 | 3/2014 | Farrell et al. | |
| 8,972,670 B2 | 3/2015 | Farrell et al. | |
| 9,122,634 B2 | 9/2015 | Farrell et al. | |
| 9,542,260 B2 | 1/2017 | Farrell et al. | |
| 9,778,869 B2 | 10/2017 | Farrell et al. | |
| 2003/0033537 A1 | 2/2003 | Fujimoto | |
| 2003/0115476 A1 | 6/2003 | McKee | |
| 2004/0064618 A1 * | 4/2004 | Farrell | G06F 9/30087 710/200 |
| 2005/0228921 A1 * | 10/2005 | Sethi | G06F 13/24 710/268 |
| 2005/0268045 A1 | 12/2005 | Slegel | |
| 2005/0268071 A1 | 12/2005 | Blandy et al. | |
| 2006/0036824 A1 | 2/2006 | Greiner et al. | |
| 2006/0206687 A1 | 9/2006 | Vega | |
| 2007/0016904 A1 | 1/2007 | Adlung et al. | |
| 2007/0079296 A1 | 4/2007 | Li et al. | |
| 2008/0005488 A1 | 1/2008 | Watkins et al. | |
| 2008/0091891 A1 | 4/2008 | Shiota et al. | |
| 2009/0187724 A1 | 7/2009 | Greiner et al. | |
| 2009/0216992 A1 | 8/2009 | Greiner et al. | |
| 2009/0217098 A1 | 8/2009 | Farrell et al. | |
| 2009/0228262 A1 | 9/2009 | Farrell et al. | |
| 2013/0138907 A1 | 5/2013 | Farrell et al. | |
| 2015/0100748 A1 | 4/2015 | Farrell et al. | |
| 2016/0055051 A1 | 2/2016 | Farrell et al. | |
| 2017/0115912 A1 | 4/2017 | Farrell et al. | |

FOREIGN PATENT DOCUMENTS

| | | |
|---|---|---|
| JP | H07160583 A | 6/1995 |
| JP | H08235071 A | 9/1996 |

OTHER PUBLICATIONS

Z/VM—General Information, International Business Machines Corporation, GC24-5991-04, Fifth Edition, Apr. 2002, pp. 1-112.
"Z/Architecture—Principles of Operation," International Business Machines Corporation, SA22-7832-05, Sixth Edition, Apr. 2007, pp. 1-1218.
"System/370 Extended Architecture/Interpretive Execution," International Business Machines Corporation, SA22-7095-01, Sep. 1985, pp. 1-29.
International Search Report and Written Opinion for PCT/ EP2009/051799 dated Jul. 14, 2009, pp. 1-11.
"Logical Partition Security in the IBM eServer pSeries 690," International Business Machines Corporation, Feb. 2002, pp. 1-13.
Gainey et al., "Enhanced Dynamic Address Translation with Frame Management Function," U.S. Appl. No. 11/972,725, filed Jan. 11, 2008.
Communication pursuant to Article 94(3) EPC for Application No. 09714605.4-1225 dated Jun. 15, 2011, pp. 1-6.
"IBM System/370 Extended Architecture—Principles of Operation," Publication No. SA22-7085-1, Second Edition, Jan. 1987, pp. 1-580.
Communication Pursuant to Article 94(3) EPC for 09 7814 605.4-1951, dated Mar. 1, 2013, pp. 1-6.
Bugnion, E., et al., "Disco: Running Commodity Operating Systems on Scalable Multiprocessors," Operating Systems Review, ACM, New York, NY, vol. 31, No. 5, Dec. 1, 1997, pp. 143-156.
Waldspurger, Carl A., "Memory Resource Management in VMware ESX Server," 5th Symposium on Operating System Design and Implementation (OSDI '02), Dec. 2002, pp. 1-14.
Garfinkle, T., et al., "Virtual Machine Monitors: Current Technology and Future Trends," Computer, IEEE Computer Society, vol. 38, No. 5, XP011132222, ISSN: 0018-9162, DOI: 10.1109/MC.2005.176, May 2005, pp. 39-47.

* cited by examiner

FORMAT OF A PAGE TABLE ENTRY

MANAGING STORAGE PROTECTION FAULTS

This application is a continuation of U.S. Pat No. 10,223,015, entitled "MANAGING STORAGE PROTECTION FAULTS," issued Mar. 5, 2019, which is a continuation of U.S. Pat. No. 9,971,533, entitled "MANAGING STORAGE PROTECTION FAULTS," issued May 15, 2018, which is a continuation of U.S. Pat. No. 9,778,869, entitled "MANAGING STORAGE PROTECTION FAULTS," issued Oct. 3, 2017, which is a continuation of U.S. Pat. No. 9,542,260, entitled "MANAGING STORAGE PROTECTION FAULTS," issued Jan. 10, 2017, which is a continuation of U.S. Pat. No. 9,122,634, entitled "USE OF TEST PROTECTION INSTRUCTION IN COMPUTING ENVIRONMENTS THAT SUPPORT PAGEABLE GUESTS," issued Sep. 1, 2015, which is a continuation of U.S. Pat. No. 8,972,670, entitled "USE OF TEST PROTECTION INSTRUCTION IN COMPUTING ENVIRONMENTS THAT SUPPORT PAGEABLE GUESTS," issued Mar. 3, 2015, which is a continuation of U.S. Pat. No. 8,677,077, entitled "USE OF TEST PROTECTION INSTRUCTION IN COMPUTING ENVIRONMENTS THAT SUPPORT PAGEABLE GUESTS," issued Mar. 18, 2014, which is a continuation of U.S. Pat. No. 8,364,912, entitled "USE OF TEST PROTECTION INSTRUCTION IN COMPUTING ENVIRONMENTS THAT SUPPORT PAGEABLE GUESTS," issued Jan. 29, 2013, which is a continuation of U.S. Pat. No. 8,176,280, entitled "USE OF TEST PROTECTION INSTRUCTION IN COMPUTING ENVIRONMENTS THAT SUPPORT PAGEABLE GUESTS," issued May 8, 2012, which claims priority to U.S. Provisional Application No. 61/031,160, entitled "GUEST TEST PROTECTION INSTRUCTION WITH EXTENDED STORAGE PROTECTION IN A VIRTUAL MACHINE ENVIRONMENT," filed Feb. 25, 2008, each of which is hereby incorporated herein by reference in its entirety.

BACKGROUND

This invention relates, in general, to computing environments that support pageable guests, and in particular, to managing use of storage by multiple pageable guests of a computing environment.

At least a portion of storage of a computing environment (also referred to herein as memory) is typically shared among a plurality of processes executing within the environment. This sharing of storage increases the risk of compromising the integrity of the data stored in the storage. Thus, in order to provide data integrity, certain storage protections are applied. These protections are used to manage the storage, and thereby, protect the data.

The protections may be applied in different types of computing environments, including those that support interpretative execution and pageable guests. In a pageable guest environment, for instance, multiple guests share the same storage, and again, protections are used to provide data integrity and protect the storage. In such environments, however, information relating to the protections becomes convoluted for the guests and/or the hosts executing the guests.

SUMMARY

Based on the foregoing, a need exists for a capability that facilitates management of storage used by multiple pageable guests. In one example, a need exists for a capability that indicates whether a storage protection fault was due to host level protection or guest level protection.

The shortcomings of the prior art are overcome and additional advantages are provided through the provision of a computer program product for facilitating management of storage of a computing environment. The computer program product includes a computer readable storage medium readable by a processing circuit and storing instructions for performing a method. The method includes attempting access to a storage location by an instruction issued by a guest of the computing environment. The storage location is protected by at least one type of storage protection. Based on the attempting access to the storage location, detecting that the attempted access of the storage location failed due to a fault of a storage protection of the at least one type of storage protection protecting the storage location, wherein the storage protection is a host level of protection or a guest level of protection. Based on one or more checks, determining whether the detected failure of the attempted access is due to the host level of protection or the guest level of protection, and performing an action based on the determining. The action performed is one action based on the detected failure of the attempted access being due to the guest level of protection and is another action based on the detected failure of the attempted access being due to the host level of protection.

Computer systems and computer-implemented methods to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided that facilitates management of storage used by multiple pageable guests of a computing environment. As one example, an enhanced suppression on protection facility is provided that enables the determination of which level of protection (host or guest) caused a fault condition. As another example, a query instruction is provided (e.g., Test Protection (TPROT)) that details information regarding the area of storage indicated in the query.

Figure 1:
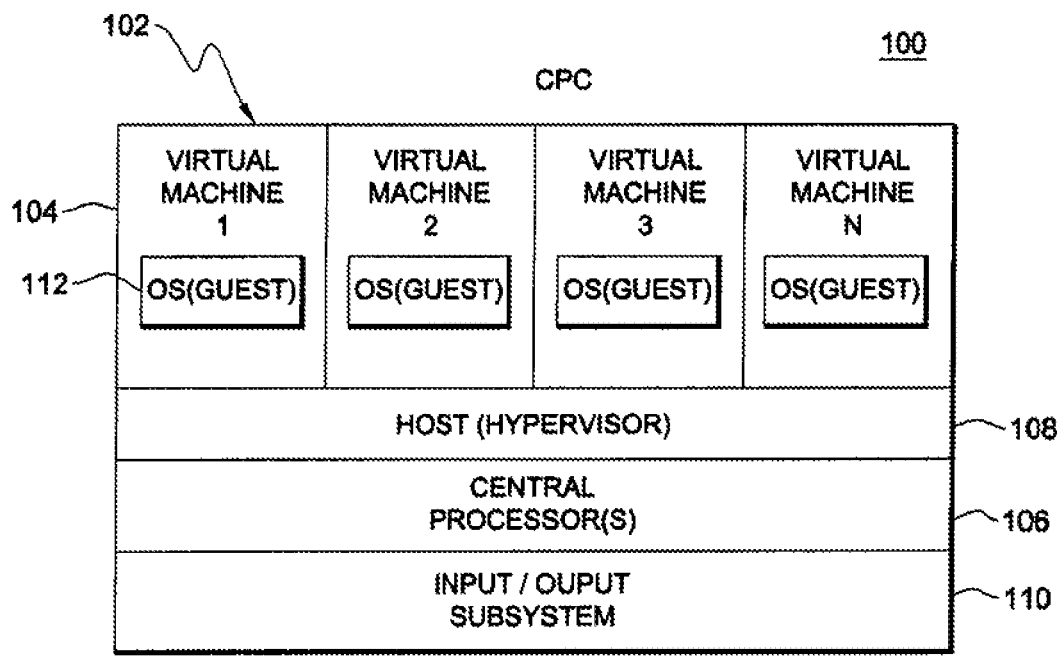
FIG. 1 depicts one embodiment of a computing environment to incorporate and use one or more aspects of the present invention.

One embodiment of a computing environment to incorporate and use one or more aspects of the present invention is described with reference to FIG. 1. Computing environment 100 is based, for instance, on the z/Architecture® offered by International Business Machines Corporation, Armonk, N.Y. The z/Architecture® is described in an IBM® publication entitled, "z/Architecture Principles of Operation," IBM® Publication No. SA22-7832-05, April, 2007, which is hereby incorporated herein by reference in its entirety. In one example, a computing environment based on the z/Architecture® includes an eServer zSeries®, offered by International Business Machines Corporation, Armonk, N.Y. IBM®, z/Architecture® and zSeries® are registered trademarks of International Business Machines Corporation, Armonk, N.Y., USA. Other names used herein may be registered trademarks, trademarks, or product names of International Business Machines Corporation or other companies.

As one example, computing environment 100 includes a central processor complex (CPC) 102 providing virtual machine support. CPC 102 includes, for instance, one or more virtual machines 104, one or more central processors 106, at least one host 108 (e.g., a control program, such as a hypervisor), and an input/output subsystem 110, each of which is described below. In this example, the virtual machines and host are included in memory.

The virtual machine support of the CPC provides the ability to operate large numbers of virtual machines, each capable of hosting a guest operating system 112, such as Linux. Each virtual machine 104 is capable of functioning as a separate system. That is, each virtual machine can be independently reset, host a guest operating system, and operate with different programs. An operating system or application program running in a virtual machine appears to have access to a full and complete system, but in reality, only a portion of it is available.

In this particular example, the model of virtual machines is a V=V model, in which the absolute or real memory of a virtual machine is backed by host virtual memory, instead of real or absolute memory. Each virtual machine has a virtual linear memory space. The physical resources are owned by host 108, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests. One or more aspects of a V=V model are further described in an IBM® publication entitled "z/VM: Running Guest Operating Systems," IBM® Publication No. SC24-5997-02, October 2001, which is hereby incorporated herein by reference in its entirety.

Central processors 106 are physical processor resources that are assignable to a virtual machine. For instance, virtual machine 104 includes one or more logical processors, each of which represents all or a share of a physical processor resource 106 that may be dynamically allocated to the virtual machine. Virtual machines 104 are managed by host 108. As examples, the host may be implemented in microcode running on processors 106 or be part of a host operating system executing on the machine. In one example, host 108 is a VM hypervisor, such as z/VM®, offered by International Business Machines Corporation, Armonk, N.Y. One embodiment of z/VM® is described in an IBM® publication entitled "z/VM: General Information Manual," IBM Publication No. GC24-5991-04, October 2001, which is hereby incorporated herein by reference in its entirety.

Input/output subsystem 110 directs the flow of information between devices and main storage. It is coupled to the central processing complex, in that it can be part of the central processing complex or separate therefrom. The I/O subsystem relieves the central processors of the task of communicating directly with the I/O devices coupled to the CPC and permits data processing to proceed concurrently with I/O processing.

In one embodiment, the host (e.g., z/VM®) and processor (e.g., System z) hardware/firmware interact with each other in a controlled cooperative manner in order to process V=V guest operating system operations without requiring transfer of control from/to the guest operating system and the host. Guest operations can be executed directly without host intervention via a facility that allows instructions to be interpretively executed for a pageable storage mode guest. This facility provides an instruction, Start Interpretive Execution (SIE), which the host can issue, designating a control block called a state description which holds guest (virtual machine) state and controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception. One example of interpretive execution is described in System/370 Extended Architecture/Interpretive Execution, IBM Publication No. SA22-7095-01, September 1985, which is hereby incorporated herein by reference in its entirety.

In one example, the interpretative execution facility is an element of the Processor Resource/Systems Manager® (PR/SM) offered by IBM®. It permits a virtual server instruction stream to be run on the processor using a single instruction-Start Interpretive Execution (SIE). The SIE instruction is used by the server's logical partitioning (LPAR) support to divide, for instance, a zSeries® or S/390 processor complex into proven secure logical partitions. (Note: The IBM® S/390 CMOS G6 family of processors PR/SM facility received certification at the ITSEC E4 level of security.)

The SIE instruction runs a virtual server dispatched by the control program until the server's time slice has been consumed or until the server wants to perform an operation that the hardware cannot virtualize or for which the control program is to regain control. At that point, the SIE instruction ends and control is returned to the control program, which either simulates the instruction or places the virtual server in an involuntary wait state. When complete, the control program again schedules the virtual server to run, and the cycle starts again. In this way, the full capabilities and speed of the CPU are available to the virtual server. Only those privileged instructions that require assistance from or validation by the control program are intercepted. These SIE intercepts, as they are known as, are also used by the control program to impose limits on the operations a virtual server may perform on a real device.

Moreover, this mechanism enables the control program to limit the scope of many kinds of hardware or software failures. If the error can be isolated to a particular virtual server, only that virtual server fails and the operation can be retried or the virtual server can be reinitialized (rebooted) without affecting any testing or production work running in other virtual servers. The control program is designed so that failures occurring in virtual servers do not affect the control program or other virtual servers.

Figure 2:
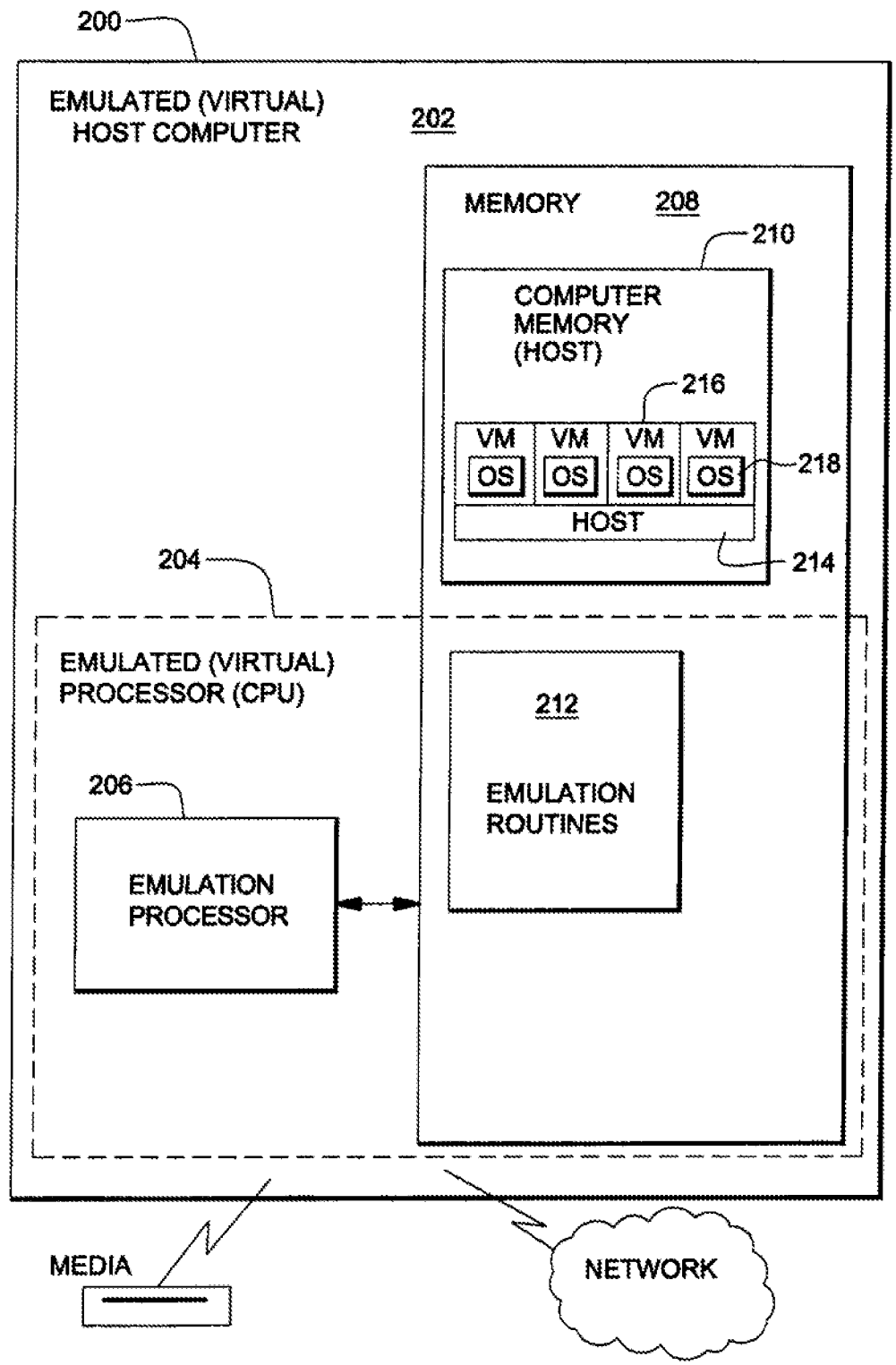
FIG. 2 depicts one embodiment of an emulated computing environment to incorporate and use one or more aspects of the present invention.

Another example of a computing environment to incorporate one or more aspects of the present invention is depicted in FIG. 2. In this example, an emulated host computer system 200 is provided that emulates a host computer 202 of a host architecture. In emulated host computer system 200, a host processor (CPU) 204 is an emulated host processor (or virtual host processor) and is realized through an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 202 according to host computer architecture, and may include both a host or hypervisor 214 and one or more virtual machines 216 running guest operating systems 218, analogous to the like-named elements in FIG. 1.

Emulation processor 206 executes native instructions of an architected instruction set of an architecture other than that of the emulated processor 204. The native instructions are obtained, for example, from emulation routines memory 212. Emulation processor 206 may access a host instruction for execution from a program in host computer memory 210 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the host seeks to execute a guest program in a virtual machine. The emulation routines 212 may include support for this instruction, and for executing a sequence of guest instructions in a virtual machine 216 in accordance with the definition of this SIE instruction.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 206 (such as general registers and dynamic translation of virtual addresses) to improve performance of the emulation routines. Special hardware and offload engines may also be provided to assist processor 206 in emulating the function of host computer 202.

Many types of computing environments, including those described above, general purpose computers, data processing systems, and others, employ storage organized using a virtual memory scheme. A virtual memory system organizes storage in units called blocks (or pages). These blocks are moved between a fast, primary memory and one or more larger and usually slower, secondary, tertiary, etc. storage units. The movement of blocks (often called swapping) is transparent to the applications or processes that are executed in the computing environment, enabling the applications or processes to behave as if they each have an unlimited amount of storage.

Although a general virtual memory allows applications and/or processes that are executing in a computing environment to behave as if they have an unlimited amount of memory at their disposal, in actuality, the amount of storage available to a particular application or process is limited by the amount of storage in the computing environment and further limited by the number of concurrently executing programs sharing that storage. A virtual memory scheme hides the actual physical address of memory from the application programs. Application programs access their memory space using a logical address (e.g., virtual address), which is then converted to a physical address by the computing environment.

The process of translating a virtual address during a storage reference into the corresponding real address or absolute address is referred to as dynamic address translation (DAT). The virtual address may be a primary virtual address, a secondary virtual address, an Access Register specified virtual address, or a home virtual address. These addresses are translated by means of a primary, a secondary, an AR specified, or a home address space control element, respectively. After selection of the appropriate address space control element, the translation process is the same for all of the four types of virtual address. DAT may use from five to two levels of tables (region first table, region second table, region third table, segment table, and page table) as transformation parameters. An enhanced dynamic address translation (EDAT) process may use from five to one levels of table, by omitting the page table for some or all translations. The designation (origin and length) of the highest level table for a specific address space is called an address space control element, and it is found for use by DAT in a control register or as specified by an access register. Alternatively, the address space control element for an address space may be a real space designation, which indicates that DAT is to translate the virtual address simply by treating it as a real address and without using any tables.

DAT uses, at different times, the address space control elements in different control registers or specified by the access registers. The choice is determined by the program-specified translation mode specified in the current PSW (Program Status Word). Four translation modes are available: primary space mode, secondary space mode, access register mode, and home space mode. Different address spaces are addressable depending on the translation mode.

The result of enhanced DAT upon a virtual address may be either a real or an absolute address. If it is a real address, a prefixing operation is then performed to obtain the corresponding absolute address, which can be used to reference memory. Prefixing provides the ability to assign the range of real addresses 0-8191 (as an example) to a different area in absolute storage for each CPU, thus permitting more than one CPU sharing main storage to operate concurrently with a minimum of interference, especially in the processing of interruptions. Prefixing causes real addresses in the range 0-8191 to correspond one-for-one to the area of 8K byte absolute addresses (the prefix area) identified by the value in bit positions 0-50 of the prefix register for the CPU, and the area of real addresses identified by that value in the prefix register to correspond one-for-one to absolute addresses 0-8191. The remaining real addresses are the same as the corresponding absolute addresses. This transformation allows each CPU to access all of main storage, including the first 8K bytes and the locations designated by the prefix registers of other CPUs.

Dynamic address translation, prefixing, and enhanced DAT are described in more detail in U.S. Ser. No. 11/972,725, entitled, "Enhanced Dynamic Address Translation with Frame Management Function," Gainey et al., filed Jan. 11, 2008, which is hereby incorporated herein by reference in its entirety.

To facilitate an understanding of one or more aspects of the present invention, reference is made to various terms and data structures (e.g., tables, lists), which are described below.

Frame Descriptor

A frame descriptor describes a host page frame; that is, an area of real memory (frame) capable of holding a portion of virtual memory (page). It is allocated, deallocated, and initialized by the host and may be updated by Host Page Management Assist functions (as described, for instance in U.S. Ser. No. 10/854,990, entitled "Facilitating Management of Storage of a Pageable Mode Virtual Environment Absent Intervention of a Host of the Environment," Blandy et al., filed May 27, 2004, which is hereby incorporated herein by reference in its entirety).

Figure 3:
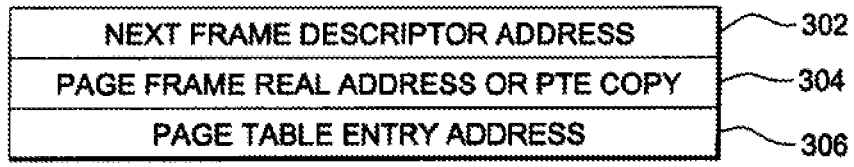
FIG. 3 depicts one example of a frame descriptor used in accordance with an aspect of the present invention.

In one example, a frame descriptor 300 (FIG. 3) is, for instance, a 32-byte block residing in host home space virtual storage on a 32 byte boundary, and includes the following fields, as examples:

(a) Next Frame Descriptor Address 302: In one example, the contents of this field, with five zeros appended on the right, specify the host home space virtual address of the next frame descriptor on the list. A value of zero indicates that the frame descriptor is the last on the list. This field is initialized by the host and may be changed by the host or by Host Page Management Assist functions.

(b) Page Frame Real Address or PTE Copy 304: When the frame descriptor is in the available frame descriptor list (AFDL), the contents of this field, with twelve zeros appended on the right, specify the host real address of the first byte (byte 0) of a host frame that is available for allocation to provide host storage.

When the frame descriptor is in a processed frame descriptor list (PFDL), this field includes a copy of the page table entry (PTE) designated by the page table entry address field, as it appeared before the host page was resolved.

This field is initialized by the host and may be changed by the host or by Host Page Management Assist functions.

(c) Page Table Entry Address 306: When the frame descriptor is on the processed frame descriptor list, the contents of this field, with three zeros appended on the right, specify the host real or host absolute address of the page table entry for the host virtual page.

This field is initialized by the host and may be changed by the host or by Host Page Management Assist functions.

Multiple frame descriptors may be linked to one another to form a list, such as an available frame descriptor list (AFDL) or a processed frame descriptor list (PFDL). A frame descriptor exists in one of the two lists. A separate pair of these lists is provided for each CPU. The origins of the AFDL and PFDL for a CPU are designated by means of fields in the prefix area of the CPU.

The available frame descriptor list (AFDL) is a list of frame descriptors that describes host frames the host has cleared and has made available for allocation to host pages. The AFDL is designated by an AFDL origin (AFDLO) at a specified host real address.

The contents of the AFDLO, with five zeros appended on the right, specify the host home space virtual address of the first frame descriptor on the AFDL. A value of zero indicates that the list is empty.

The AFDLO is initialized by the host and may be changed by the host or Host Page Management Assist functions. The AFDLO is changed, in one embodiment, by means of a non-interlocked update operation.

The processed frame descriptor list (PFDL) is a list of frame descriptors that describes host frames that have been used to resolve host page invalid conditions during guest interpretation. The host frames that are described by the PFDL have been assigned to host pages that provide storage for a guest. The PFDL is designated by a PFDL origin (PFDLO) at a specified host real address. The contents of the PFDLO, with five zeros appended on the right, specify the host home space virtual address of the first frame descriptor on the PFDL. A value of zero indicates that the list is empty.

The PFDLO is initialized by the host and may be changed by the host or a Host Page Management Assist function. The PFDLO is changed, in one embodiment, by means of a doubleword concurrent interlocked update operation that maintains the integrity of the list.

Region Table Entries

Figure 4A:
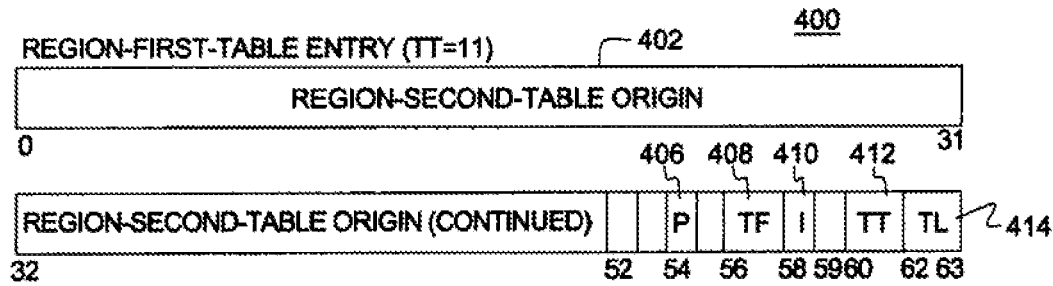
FIGS. 4A-4C depict examples of region table entries used in accordance with an aspect of the present invention.
Figure 4B:
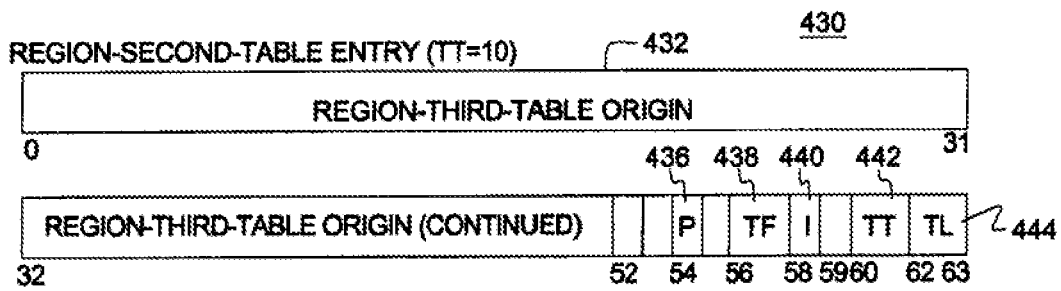
Figure 4C:
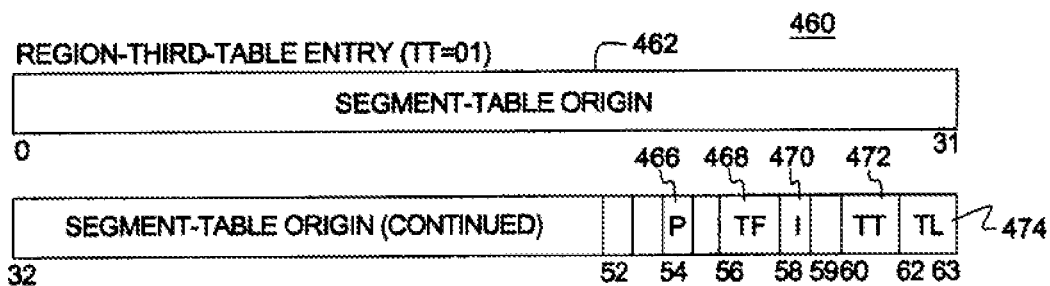

The term "region table entry" indicates a region first table entry, a region second table entry, or a region third table entry. The level (first, second, or third) of the table containing an entry is identified by the table type (TT) bits in the entry. Examples of the formats of entries fetched from the region first table, region second table, and region third table are depicted in FIGS. 4A-4C. In particular, FIG. 4A depicts one embodiment of the format of a Region First Table entry 400; FIG. 4B depicts one embodiment of the format of a Region Second Table entry 430; and FIG. 4C depicts one embodiment of the format of a Region Third Table entry 460.

As examples, the fields in the three levels of region table entries are allocated as follows:

Region Second Table Origin 402, Region Third Table Origin 432, and Segment Table Origin 462:

A region first table entry includes a region second table origin. A region second table entry includes a region third table origin. A region third table entry includes a segment table origin. The following description applies to each of the three origins. In one example, bits 0-51 of the entry, with 12 zeros appended on the right, form a 64-bit address that designates the beginning of the next lower level table.

DAT Protection Bit (P) 406, 436, 466:

When enhanced DAT applies, bit 54 is treated as being OR'ed with the DAT protection bit in each subsequent region table entry, segment table entry, and, when applicable, page table entry used in the translation. Thus, when the bit is one, DAT protection applies to the entire region or regions specified by the region table entry. When the enhanced DAT facility is not installed, or when the facility is installed but the enhanced DAT enablement control is zero, bit 54 of the region table entry is ignored.

Region Second Table Offset 408, Region Third Table Offset 438, and Segment Table Offset (TF) 468:

A region first table entry includes a region second table offset. A region second table entry includes a region third table offset. A region third table entry includes a segment table offset. The following description applies to each of the three offsets. Bits 56 and 57 of the entry specify the length of a portion of the next lower level table that is missing at the beginning of the table; that is, the bits specify the location of the first entry actually existing in the next lower level table. The bits specify the length of the missing portion in units of 4,096 bytes, thus making the length of the missing portion variable in multiples of 512 entries. The length of the missing portion, in units of 4,096 bytes, is equal to the TF value. The contents of the offset field, in conjunction with the length field, bits 62 and 63, are used to establish whether the portion of the virtual address (RSX, RTX, or SX) to be translated by means of the next lower level table designates an entry that actually exists in the table.

Region Invalid Bit (I) 410, 440, 470:

A region is a contiguous range of, for example, 2 gigabytes of virtual addresses. Bit 58 in a region first table entry or region second table entry controls whether the set of regions associated with the entry is available. Bit 58 in a region third table entry controls whether the single region associated with the entry is available. When bit 58 is zero, address translation proceeds by using the region table entry. When the bit is one, the entry cannot be used for translation.

Table Type Bits (TT) 412, 442, 472:

Bits 60 and 61 of the region first table entry, region second table entry, and region third table entry identify the level of the table containing the entry, as follows: Bits 60 and 61 identify the correct table level, considering the type of table designation that is the address space control element being used in the translation and the number of table levels that have so far been used; otherwise, a translation specification exception is recognized. As an example, the following table shows the table type bits:

| Table Type bits for region table Entries | |
|---|---|
| Bits 60 and 61 | Region-Table Level |
| 11 | First |
| 10 | Second |
| 01 | Third |

Region Second Table Length 414, Region Third Table Length 444, and Segment Table Length 474 (TL):

A region first table entry includes a region second table length. A region second table entry includes a region third table length. A region third table entry includes a segment table length. The following description applies to each of the three lengths. Bits 62 and 63 of the entry specify the length of the next lower level table in units of 4,096 bytes, thus making the length of the table variable in multiples of 512 entries. The length of the next lower level table, in units of 4,096 bytes, is one more than the TL value. The contents of the length field, in conjunction with the offset field, bits 56 and 57, are used to establish whether the portion of the virtual address (RSX, RTX, or SX) to be translated by means of the next lower level table designates an entry that actually exists in the table.

All other bit positions of the region table entry are reserved for possible future extensions and should contain zeros; otherwise, the program may not operate compatibly in the future. When enhanced DAT applies, the reserved bit positions of the region table entry should contain zeros even if the table entry is invalid.

Segment Table Entries

Figure 5A:
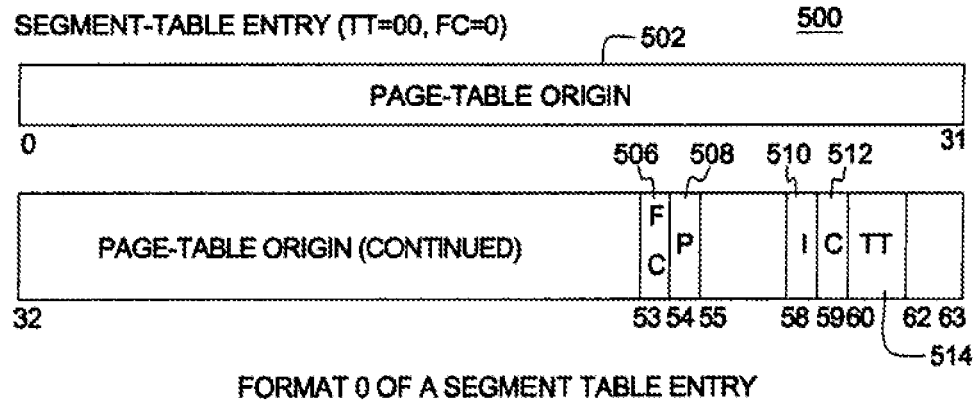
FIGS. 5A-5B depict examples of segment table entries used in accordance with an aspect of the present invention.
Figure 5B:
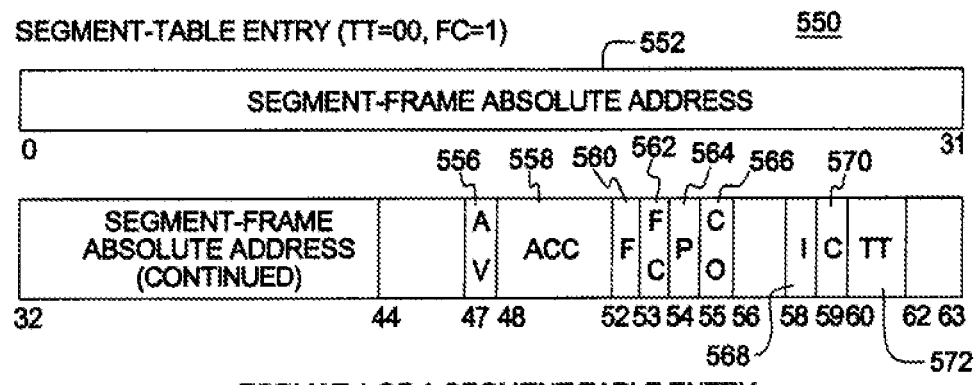

When enhanced DAT does not apply, or when enhanced DAT applies and the STE format control, bit 53 of the segment table entry, is zero, the entry fetched from the segment table has the format (e.g., Format 0) as depicted in FIG. 5A. When enhanced DAT applies and the STE format control is one, the entry fetched from the segment table has, for example, the format (e.g., Format 1) as depicted in FIG. 5B.

As one example, a Format 0 segment table entry 500 (FIG. 5A) includes the following fields:

Page Table Origin 502:

When enhanced DAT does not apply, or when enhanced DAT applies but the STE format control, bit 53 of the segment table entry, is zero, bits 0-52, with 11 zeros appended on the right, form a 64-bit address that designates the beginning of a page table. It is unpredictable whether the address is real or absolute.

STE Format Control (FC) 506:

When enhanced DAT applies, bit 53 is the format control for the segment table entry, as follows:

When the FC bit is zero, bits 0-52 of the entry form the page table origin, and bit 55 is reserved.

When the FC bit is one, bits 0-43 of the entry form the segment frame absolute address, bit 47 is the ACCF validity control, bits 48-51 are the access control bits, bit 52 is the fetch protection bit, and bit 55 is the change recording override. When enhanced DAT does not apply, bit 53 is ignored.

DAT Protection Bit (P) 508:

Bit 54, when one, indicates that DAT protection applies to the entire segment.

When enhanced DAT does not apply, bit 54 is treated as being OR'ed with the DAT protection bit in the page table entry used in the translation.

When enhanced DAT applies, the DAT protection bit in any and all region table entries used in the translation are treated as being OR'ed with the DAT protection bit in the segment table entry; when the STE format control is zero, the DAT protection bit in the STE is further treated as being OR'ed with the DAT protection bit in the page table entry.

Segment Invalid Bit (I) 510:

Bit 58 controls whether the segment associated with the segment table entry is available.

When the bit is zero, address translation proceeds by using the segment table entry.

When the bit is one, the segment table entry cannot be used for translation.

Common Segment Bit (C) 512:

Bit 59 controls the use of the translation lookaside buffer (TLB) copies of the segment table entry. When enhanced DAT does not apply or when enhanced DAT applies but the format control is zero, bit 59 also controls the use of the TLB copies of the page table designated by the segment table entry.

A zero identifies a private segment; in this case, the segment table entry and any page table it designates may be used only in association with the segment table origin that designates the segment table in which the segment table entry resides.

A one identifies a common segment; in this case, the segment table entry and any page table it designates may continue to be used for translating addresses corresponding to the segment index, even though a different segment table is specified.

However, TLB copies of the segment table entry and any page table for a common segment are not usable if the private space control, bit 55, is one in the address space control element used in the translation or if that address space control element is a real space designation. The common segment bit is to be zero if the segment table entry is fetched from storage during a translation when the private space control is one in the address space control element being used; otherwise, a translation specification exception is recognized.

Table Type Bits (TT) 514:

Bits 60 and 61 of the segment table entry are 00 binary to identify the level of the table containing the entry. The meanings of possible values of bits 60 and 61 in a region table entry or segment table entry are as follows:

| Table Type Bits 60, 61 | |
|---|---|
| Bits 60 and 61 | Table Level |
| 11 | Region-first |
| 10 | Region-second |
| 01 | Region-third |
| 00 | Segment |

Bits 60 and 61 are to identify the correct table level, considering the type of table designation that is the address space control element being used in the translation and the number of table levels that have so far been used; otherwise, a translation specification exception is recognized.

All other bit positions of the segment table entry are reserved for possible future extensions and should contain zeros; otherwise, the program may not operate compatibly in the future. When enhanced DAT applies, the reserved bit positions of the segment table entry should contain zeros even if the table entry is invalid.

As one example, a Format 1 segment table entry 550 (FIG. 5B) includes the following fields:

Segment Frame Absolute Address (SFAA) 552:

When enhanced DAT applies and the STE format control is one, bits 0-43 of the entry, with 20 zeros appended on the right, form the 64-bit absolute address of the segment.

ACCF Validity Control (AV) 556:

When enhanced DAT applies and the STE format control is one, bit 47 is the access control bits and fetch protection bit (ACCF) validity control. When the AV control is zero, bits 48-52 of the segment table entry are ignored. When the AV control is one, bits 48-52 are used as described below.

Access Control Bits (ACC) 558:

When enhanced DAT applies, the STE format control is one, and the AV control is one, bits 48-51 of the segment table entry include the access control bits that may be used for any key controlled access checking that applies to the address.

Fetch Protection Bit (F) 560:

When enhanced DAT applies, the STE format control is one, and the AV control is one, bit 52 of the segment table entry includes the fetch protection bit that may be used for any key controlled access checking that applies to the address.

STE Format Control (FC) 562:

When enhanced DAT applies, bit 53 is the format control for the segment table entry, as follows:

When the FC bit is zero, bits 0-52 of the entry form the page table origin, and bit 55 is reserved.

When the FC bit is one, bits 0-43 of the entry form the segment frame absolute address, bit 47 is the ACCF validity control, bits 48-51 are the access control bits, bit 52 is the fetch protection bit, and bit 55 is the change recording override. When enhanced DAT does not apply, bit 53 is ignored.

DAT Protection Bit (P) 564:

Bit 54, when one, indicates that DAT protection applies to the entire segment.

When enhanced DAT does not apply, bit 54 is treated as being OR'ed with the DAT protection bit in the page table entry used in the translation.

When enhanced DAT applies, the DAT protection bit in any and all region table entries used in the translation are treated as being OR'ed with the DAT protection bit in the segment table entry; when the STE format control is zero, the DAT protection bit in the STE is further treated as being OR'ed with the DAT protection bit in the page table entry.

Change Recording Override (CO) 566:

When enhanced DAT applies, and the STE format control is one, bit 55 of the segment table entry is the change recording override for the segment. When enhanced DAT does not apply, or when enhanced DAT applies but the STE format control is zero, bit 55 of the segment table entry is ignored.

Segment Invalid Bit (I) 568:

Bit 58 controls whether the segment associated with the segment table entry is available.

When the bit is zero, address translation proceeds by using the segment table entry.

When the bit is one, the segment table entry cannot be used for translation.

Common Segment Bit (C) 570:

Bit 59 controls the use of the translation lookaside buffer (TLB) copies of the segment table entry. When enhanced DAT does not apply or when enhanced DAT applies but the format control is zero, bit 59 also controls the use of the TLB copies of the page table designated by the segment table entry.

A zero identifies a private segment; in this case, the segment table entry and any page table it designates may be used only in association with the segment table origin that designates the segment table in which the segment table entry resides.

A one identifies a common segment; in this case, the segment table entry and any page table it designates may continue to be used for translating addresses corresponding to the segment index, even though a different segment table is specified.

However, TLB copies of the segment table entry and any page table for a common segment are not usable if the private space control, bit 55, is one in the address space control element used in the translation or if that address space control element is a real space designation. The common segment bit is to be zero if the segment table entry is fetched from storage during a translation when the private space control is one in the address space control element being used; otherwise, a translation specification exception is recognized.

Table Type Bits (TT) 572:

Bits 60 and 61 of the segment table entry are 00 binary to identify the level of the table containing the entry. The meanings of possible values of bits 60 and 61 in a region table entry or segment table entry are as follows:

| Table Type Bits 60, 61 | |
| --- | --- |
| Bits 60 and 61 | Table Level |
| 11 | Region-first |
| 10 | Region-second |
| 01 | Region-third |
| 00 | Segment |

Bits 60 and 61 are to identify the correct table level, considering the type of table designation that is the address space control element being used in the translation and the number of table levels that have so far been used; otherwise, a translation specification exception is recognized.

All other bit positions of the segment table entry are reserved for possible future extensions and should contain zeros; otherwise, the program may not operate compatibly in the future. When enhanced DAT applies, the reserved bit positions of the segment table entry should contain zeros even if the table entry is invalid.

Page Table Entries

The state information for guest blocks (e.g., an area (e.g., 4 K-Bytes) in absolute memory that has associated therewith a single storage key and CMM state) is maintained, for instance, in host page tables (PTs) and page status tables (PGSTs) that describe a guest's memory. These tables include, for instance, one or more page table entries (PTEs) and one or more page status table entries (PGSTEs), respectively, which are described in further detail below.

Figure 6:
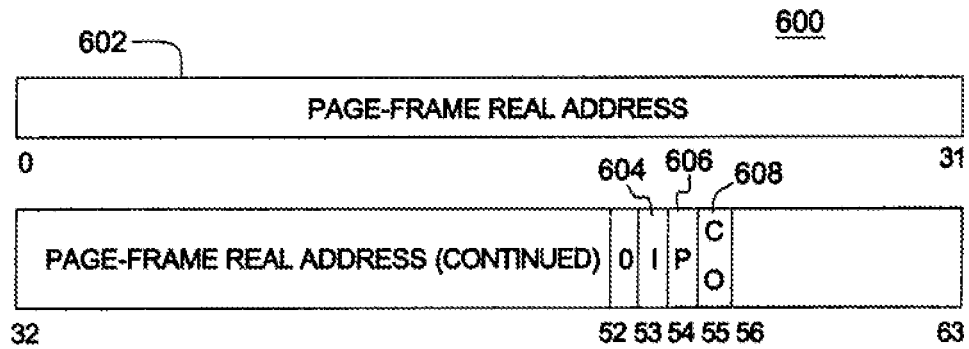
FIG. 6 depicts one example of a page table entry used in accordance with an aspect of the present invention.

One example of a page table entry 600 is described with reference to FIG. 6. In one embodiment, the fields in the page table entry are allocated as follows:

Page Frame Real Address (PFRA) 602:

Bits 0-51 provide the leftmost bits of a real (in this case host real) storage address. When these bits are concatenated with the 12-bit byte index field of the virtual address on the right, a 64-bit real address is obtained.

Page Invalid Bit (I) 604:

Bit 53 controls whether the page associated with the page table entry is available. When the bit is zero, address translation proceeds by using the page table entry. Further, with regard to collaborative memory management (CMM) between host and guest, the host state is r (resident; i.e., the guest block is present in a host frame). When the bit is one, the page table entry is not used for translation, and the CMM host state is p (preserved; i.e., the guest block is not present in a host frame, but has been preserved by the host in some auxiliary storage) or z (logically zero; i.e., the guest block is not present in a host frame and the contents of the guest block are known to be zeros), as determined by PGSTE.Z.

DAT Protection Bit (P) 606:

Bit 54 controls whether store accesses can be made in the page. This protection mechanism is in addition to the key controlled protection and low address protection mechanisms. The bit has no effect on fetch accesses. If the bit is zero, stores are permitted to the page, subject to the following additional constraints:

The DAT protection bit being zero in the segment table entry used in the translation.

When enhanced DAT applies, the DAT protection bit being zero in all region table entries used in the translation.

If the DAT protection bit is one, stores are disallowed. When no higher priority exception conditions exist, an attempt to store when the DAT protection bit is one causes a protection exception to be recognized. The DAT protection bit in the segment table entry is treated as being OR'ed with bit 54 when determining whether DAT protection applies to the page. When enhanced DAT applies, the DAT protection bit in any region table entries used in translation are also treated as being OR'ed with bit 54 when determining whether DAT protection applies.

Other protection mechanisms, such as key-controlled protection, low-address protection, and access-list-controlled protection, may apply independently of DAT protection and may also prohibit accesses.

Change Recording Override (CO) 608:

When enhanced DAT does not apply, bit 55 of the page table entry is to contain zero; otherwise, a translation specification exception is recognized as part of the execution of an instruction using that entry for address translation. When enhanced DAT applies and the STE format control is zero, bit 55 of the page table entry is the change recording override for the page.

In addition to the above, in one example, bit position 52 of the entry is to contain zero; otherwise, a translation specification exception is recognized as part of the execution of an instruction using that entry for address translation. Bit positions 56-63 are not assigned and are ignored.

Figure 7:
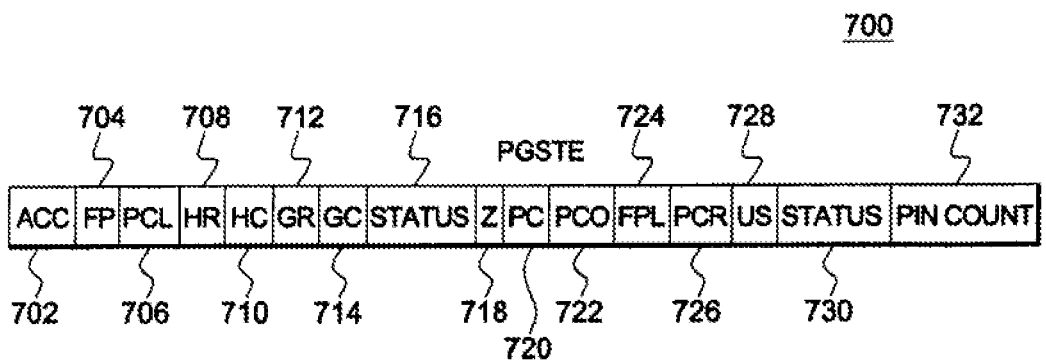
FIG. 7 depicts one example of a page status table entry used in accordance with an aspect of the present invention.

One example of a page status table entry is described with reference to FIG. 7. A page status table entry 700 includes, for instance, the following:

(a) Acc 702: Access control key;
(b) FP 704: Fetch protection indicator;
(c) Page Control Interlock (PCL) 706: This is the interlock control for serializing updates to a page table entry (PTE) and corresponding PGSTE, except for the PGSTE status area and PGSTE bits that are marked as reserved.
(d) HR 708: Host reference backup indicator;
(e) HC 710: Host change backup indicator;
(f) GR 712: Guest reference backup indicator;
(g) GC 714: Guest change backup indicator;
(h) Status 716: Intended for host program use.
(i) Page Content Logically Zero Indicator (Z) 718: This bit is meaningful when the corresponding PTE page invalid (PTE.I) bit is one.
  When Z is one, the content of the page that is described by this PGSTE and corresponding PTE is considered to be zero. Any prior content of the page does not have to be preserved and may be replaced by a page of zeros.
  When Z is zero, the content of the page described by the PGSTE and corresponding PTE is not considered to be zero. The content of the page is preserved by the host.
  When the Z bit is one and the corresponding PTE.I bit is one, the CMM host state is z (logically zero). This means that the page content may be replaced by the host or by a function of the Host Page Management Assist facility.
  When the Z bit is one, the corresponding PTE.I bit is one, and the page content is replaced, the page should be replaced by associating it with a frame that has been set to zeros.
  When the Z bit is zero and the PTE invalid bit is one, the CMM host state is p (preserved).
(j) Page Class (PC) 720: When zero, the page described by the PGSTE and corresponding PTE is a class 0 page and the delta pinned page count array (DPPCA) for class 0 pages is used for counting pinning and unpinning operations for the page. When one, the page described by the PGSTE and corresponding PTE is a class 1 page and the DPPCA for class 1 pages is used for counting pinning and unpinning operations for the page.

(k) Pin Count Overflow (PCO) 722: When one, the pin count field is in an overflow state. In this case, the total pin count is kept by the host in another data structure not accessed by the machine. When zero, the pin count field is not in an overflow state.

(l) Frame Descriptor On Processed Frame Descriptor List (FPL) 724: When one, a frame descriptor for the page described by the PGSTE and corresponding PTE is in a processed frame descriptor list. The frame descriptor identifies the host frame that was used by a HPMA resolve host page function for the page.

(m) Page Content Replacement Requested (PCR) 726: When one, page content replacement was requested when the HPMA resolve host page function was invoked for the page represented by the PGSTE and corresponding PTE.

(n) Usage State (US) 728: For collaborative memory management between host and guest, this field indicates whether the guest state is S (stable; i.e., the contents of a stable block remain equal to what was set by the guest); U (unused; i.e., the contents of an unused block are not meaningful to the guest); V (volatile; i.e., the contents of a volatile block are meaningful to the guest, but the host may at any time discard the contents of the block and reclaim the backing frame); or P (potentially volatile; i.e., the contents of a potentially volatile block are meaningful to the guest, but based upon guest change history, the host either may discard or should preserve the contents of the block).

(o) Status 730: Intended for host program use.

(p) Pin Count 732: An unsigned binary integer count used to indicate whether the content of the host virtual page represented by the PGSTE and corresponding PTE is pinned in the real host frame specified by the page frame real address field of the PTE. When the value of this field is greater than zero or the page count overflow (PCO) bit is one, the corresponding page is considered to be pinned. When the value of this field is zero and the PCO bit is zero, the corresponding page is not considered to be pinned.

At the time a page is pinned by either the host or the CPU, this field should be incremented by 1. At the time a page is unpinned by either the host or the CPU, this field should be decremented by 1.

When the value of the pin count field is greater than zero or the PCO bit is one, the corresponding PTE.I (page invalid) bit is to be zero. Otherwise, unpredictable results may occur.

While a page is pinned, the host program should not change the contents of the PTE page frame real address (PFRA) field, the setting of the PTE page invalid (I) bit, or the setting of the page protection (P) bit in the PTE or segment table entry (STE). Otherwise unpredictable results may occur.

Further details regarding page table entries and page tables, as well as segment table entries, are provided in an IBM® publication entitled, "z/Architecture Principles of Operation," IBM® Publication No. SA22-7832-05, April 2007, which is hereby incorporated herein by reference in its entirety. Moreover, further details regarding the PGSTE are described in U.S. Ser. No. 10/854,990, entitled "Facilitating Management of Storage of a Pageable Mode Virtual Environment Absent Intervention of a Host of the Environment," Blandy et al., filed May 27, 2004; and in U.S. Patent Application Publication No. US 2007/0016904 A1, entitled, "Facilitating Processing Within Computing Environment Supporting Pageable Guests," Adlung et al., published Jan. 18, 2007, each of which is hereby incorporated herein by reference in its entirety.

In one embodiment, there is one page status table per page table, the page status table is the same size as the page table, a page status table entry is the same size as a page table entry, and the page status table is located at a fixed displacement (in host real memory) from the page table. Thus, there is a one-to-one correspondence between each page table entry and page status table entry. Given the host's virtual address of a page, both the machine and the host can easily locate the page status table entry that corresponds to a page table entry for a guest block.

Copy-On-Write

At times, portions of memory are to be copied. This copying can either be user-initiated or initiated by an operating system. Conventional systems often use a lazy copy technique for a flash copy, in which the storage to be copied is assigned a status of read-only, but the actual copy is deferred until later. If an attempt is made to write into either the original or the copy, then the memory is copied at that time and both the original and the copy are given an input/output (I/O) status of read-write. In this way, it appears that a copy was made immediately, but the actual copying is deferred until later (e.g., the latest possible time). If no write is performed, no copying occurs. For this reason, this method is called copy-on-write (COW) or virtual copy.

Generally, a copy-on-write operation is computationally expensive because a single write results in two write operations. That is, an existing data block is copied from an old physical block to a new physical block, and then the actual update/write operation is performed on the new physical block.

Instruction Execution

In the z/Architecture®, for example, instruction execution ends in one of five ways: completion, nullification, suppression, termination, and partial completion, each of which is described below.

Completion of instruction execution provides results as called for in the definition of the instruction. When an interruption occurs after the completion of the execution of an instruction, the instruction address in the old PSW designates the next sequential instruction.

Nullification of instruction execution has the same effect as suppression, described below, except that when an interruption occurs after the execution of an instruction has been nullified, the instruction address in the old PSW designates the instruction whose execution was nullified (or an Execute instruction, as appropriate), instead of the next sequential instruction.

Suppression of instruction execution causes the instruction to be executed as if it specified "no operation." The contents of any result fields, including the condition code, are not changed. The instruction address in the old PSW on an interruption after suppression designates the next sequential instruction.

Termination of instruction execution causes the contents of any fields due to be changed by the instruction to be unpredictable. The operation may replace all, part, or none of the contents of the designated result fields and may change the condition code if such change is called for by the instruction. Unless the interruption is caused by a machine-check condition, the validity of the instruction address in the PSW, the interruption code, and the instruction length code are not affected, and the state or the operation of the machine is not affected in any other way. The instruction address in the old PSW on an interruption after termination designates the next sequential instruction.

Partial completion of instruction execution occurs for interruptible instructions.

Although the execution of an instruction is treated as a no-operation when suppression or nullification occurs, stores may be performed as the result of the implicit tracing action associated with some instructions.

Protection

Four protection facilities are provided to protect the contents of main storage from destruction or misuse by programs that contain errors or are unauthorized: key-controlled protection, access-list-controlled protection, page protection, and low-address protection. The protection facilities are applied independently; access to main storage is permitted when none of the facilities prohibits the access. Each protection facility is described below.

Key-Controlled Protection:

Key-controlled protection affords protection against improper storing or against both improper storing and fetching, but not against improper fetching alone.

When key-controlled protection applies to a storage access, a store is permitted when the storage key matches the access key associated with the request for storage access; a fetch is permitted when the keys match or when the fetch-protection bit of the storage key is zero. The keys are said to match when the four access control bits of the storage key are equal to the access key, or when the access key is zero. The protection action is summarized in the following table:

| Conditions | | Is Access to Storage Permitted | |
|---|---|---|---|
| Fetch-Protection Bit of Storage Key | Key Relation | Fetch | Store |
| 0 | Match | Yes | Yes |
| 0 | Mismatch | Yes | No |
| 1 | Match | Yes | Yes |
| 1 | Mismatch | No | No |

Explanation:
Match The four access-control bits of the storage key are equal to the access key, or the access key is zero.
Yes Access is permitted.
No Access is not permitted. On fetching, the information is not made available to the program; on storing, the contents of the storage location are not changed.

When the access to storage is initiated by the CPU and key-controlled protection applies, the PSW key is the access key, except that the access key is specified in a general register for the first operand of certain instructions, such as Move To Secondary and Move With Destination Key; for the second operand of instructions, such as Move To Primary, Move With Key, and Move With Source Key; and for either the first or the second operand of, for instance, a Move Page instruction. The PSW key occupies, for instance, bit positions 8-11 of the current PSW. When the access to storage is for the purpose of channel-program execution, the sub-channel key associated with that channel program is the access key. The sub-channel key for a channel program is specified in the operation-request block (ORB). When, for purposes of channel-subsystem monitoring, an access to the measurement block is made, the measurement-block key is the access key. The measurement-block key is specified by, for instance, a Set Channel Monitor instruction.

When a CPU access is prohibited because of key controlled protection, the execution of the instruction is terminated, and a program interruption for a protection exception takes place. However, the unit of operation or the execution of the instruction may be suppressed. When a channel program access is prohibited, the start function is ended, and the protection-check condition is indicated in the associated interruption-response block (IRB). When a measurement-block access is prohibited, the I/O measurement-block protection-check condition is indicated. When a store access is prohibited because of key controlled protection, the contents of the protected location remain unchanged. When a fetch access is prohibited, the protected information is not loaded into a register, moved to another storage location, or provided to an I/O device. For a prohibited instruction fetch, the instruction is suppressed, and an arbitrary instruction-length code is indicated.

Key-controlled protection is independent of whether the CPU is in the problem or the supervisor state and, with some exceptions, does not depend on the type of CPU instruction or channel-command word being executed. Except where otherwise specified, accesses to storage locations that are explicitly designated by the program and that are used by the CPU to store or fetch information are subject to key-controlled protection. Key-controlled protection does not apply when the storage-protection-override control is one and the value of the four access-control bits of the storage key is, for instance, 9. Key-controlled protection for fetches may or may not apply when the fetch-protection-override control is one, depending on the effective address and the private-space control. The storage-protection-override control and fetch protection-override control do not affect storage references made by the channel subsystem. Accesses to the second operand of, for instance, a Test Block instruction are not subject to key-controlled protection. Storage accesses by the channel subsystem to access the I/O measurement block, or by a channel program to fetch a CCW, IDAW (indirect data address word), or MIDAW (modified indirect data address word) or to access a data area designated during the execution of a CCW, are subject to key-controlled protection. However, if a CCW, an IDAW, a MIDAW, or output data is prefetched, a protection check is not indicated until the CCW, IDAW, or MIDAW is due to take control or until the data is due to be written. Key-controlled protection is not applied to accesses that are implicitly made for any of such sequences as:

An interruption
CPU logout
Fetching of table entries for access-register translation, dynamic-address translation, PCnumber translation, ASN translation, or ASN authorization
Tracing
A store-status function
Storing in real locations 184-191 when a Test Pending Interruption has an operand address of zero
Initial program loading.

Similarly, protection does not apply to accesses initiated via the operator facilities for altering or displaying information. However, when the program explicitly designates these locations, they are subject to protection.

Access which are subject to key-controlled protection may be effected by a storage-protection-override control. As an example, bit 39 of control register 0 is the storage-protection-override control. When this bit is one, storage-protection override is active. When this bit is zero, storage protection override is inactive. When storage-protection override is active, key-controlled storage protection is ignored for storage locations having an associated storage-key value of, for instance, 9. When storage protection override is inactive, no special action is taken for a storage-key value of 9. Storage-protection override applies to instruction fetch and to the fetch and store accesses of instructions whose operand addresses are logical, virtual, or real. It does not apply to accesses made for the purpose of channel-program execution or for the purpose of channel-subsystem monitoring. Storage-protection override has no effect on accesses which are not subject to key-controlled protection.

Storage-protection override can be used to improve reliability in the case when a possibly erroneous application program is executed in conjunction with a reliable subsystem, provided that the application program needs to access only a portion of the storage accessed by the subsystem. The technique for doing this is as follows. The storage accessed by the application program is given storage key 9. The storage accessed by only the subsystem is given some other nonzero storage key, for example, key 8. The application is executed with PSW key 9. The subsystem is executed with PSW key 8 (in this example). As a result, the subsystem can access both the key-8 and the key-9 storage, while the application program can access only the key-9 storage.

Storage-protection override affects the accesses to storage made by the CPU and also affects the result set by Test Protection. However, those instructions which, in the problem state, test the PSW-key mask to determine if a particular key value may be used are not affected by whether storage-protection override is active. These instructions include, among others, Move With Key and Set PSW Key From Address. To permit these instructions to use an access key of 9 in the problem state, bit 9 of the PSW-key mask is to be one.

In addition to the storage-protection-override control, accesses subject to key-controlled protection may be effected by a fetch-protection-override control. As an example, bit 38 of control register 0 is the fetch-protection-override control. When the bit is one, fetch protection is ignored for locations at, for instance, effective addresses 0-2047. An effective address is the address which exists before any transformation by dynamic address translation or prefixing. However, fetch protection is not ignored if the effective address is subject to dynamic address translation and the private-space control, e.g., bit 55, is one in the address-space-control element used in the translation. Fetch-protection override applies to instruction fetch and to the fetch accesses of instructions whose operand addresses are logical, virtual, or real. It does not apply to fetch accesses made for the purpose of channel-program execution or for the purpose of channel-subsystem monitoring. When this bit is set to zero, fetch protection of locations at effective addresses 0-2047 is determined by the state of the fetch-protection bit of the storage key associated with those locations. Fetch-protection override has no effect on accesses which are not subject to key-controlled protection.

The fetch-protection-override control allows fetch protection of locations at, for instance, addresses 2048-4095 along with no fetch protection of locations at addresses 0-2047.

Access-List-Controlled Protection

In the access-register mode, bit 6 of the access-list entry, the fetch-only bit, controls which types of operand references are permitted to the address space specified by the access-list entry. When the entry is used in the access-register-translation part of a reference and bit 6 is zero, both fetch-type and store-type references are permitted; when bit 6 is one, fetch-type references are permitted, and an attempt to store causes a protection exception to be recognized and the execution of the instruction to be suppressed. The fetch-only bit is included in the ALB access-list entry. A change to the fetch-only bit in an access-list entry in main storage does not necessarily have an immediate, if any, effect on whether a protection exception is recognized. However, this change to the bit does have an effect immediately after, for example, Purge ALB or a Compare And Swap And Purge instruction that purges the ALB is executed. A Test Protection instruction, described below, takes into consideration access-list-controlled protection when the CPU is in the access-register mode. A violation of access-list controlled protection causes condition code 1, as an example, to be set, except that it does not prevent, for instance, condition code 2 or 3 from being set when the conditions for those codes are satisfied.

A violation of access-list-controlled protection causes suppression. A violation of any of the other protection types may cause termination.

Page Protection

The page-protection facility controls access to virtual storage by using the page-protection bit in each page-table entry and segment-table entry. It provides protection against improper storing. The page-protection bit, bit 54 of the page-table entry, controls whether storing is allowed into the corresponding 4K-byte page. When the bit is zero, both fetching and storing are permitted; when the bit is one, only fetching is permitted. When an attempt is made to store into a protected page, the contents of the page remain unchanged, the unit of operation or the execution of the instruction is suppressed, and a program interruption for protection takes place. The page-protection bit, bit 54 of the segment-table entry, is treated as being ORed into the page-protection-bit position of each entry in the page table designated by the segment-table entry. Thus, when the segment-table-entry page-protection bit is one, the effect is as if the page-protection bit were one in each entry in the designated page table. Page protection applies to store-type references that use a virtual address.

Low-Address Protection

The low-address-protection facility provides protection against the destruction of main-storage information used by the CPU during interruption processing. This is accomplished by prohibiting instructions from storing with effective addresses in, for instance, the ranges 0 through 511 and 4096 through 4607 (the first 512 bytes of each of the first and second 4K-byte effective-address blocks). The range criterion is applied before address transformation, if any, of the address by dynamic address translation or prefixing. However, the range criterion is not applied, with the result that low-address protection does not apply, if the effective address is subject to dynamic address translation and the private-space control, bit 55, is one in the address-space-control element used in the translation. Low-address protection does not apply if the address-space-control element to be used is not available due to another type of exception. Low-address protection is under control of bit 35 of control register 0, the low-address-protection-control bit. When the bit is zero, low-address protection is off; when the bit is one, low-address protection is on.

If an access is prohibited because of low-address protection, the contents of the protected location remain unchanged, the execution of the instruction is terminated, and a program interruption for a protection exception takes place. However, the unit of operation or the execution of the instruction may be suppressed. An attempt by the program to store by using effective addresses in, for instance, the range 0 through 511 or 4096 through 4607 is subject to low-address protection. Low-address protection is applied to the store accesses of instructions whose operand addresses are logical, virtual, or real. Low-address protection is also applied to the trace table. Low-address protection is not applied to accesses made by the CPU or the channel subsystem for such sequences as interruptions, CPU logout, the storing of the I/O-interruption code in, for instance, real locations 184-191 by Test Pending Interruption, and the initial-program-loading and store-status functions, nor is it applied to data stores during I/O data transfer. However, explicit stores by a program at any of these locations are subject to low-address protection.

Low-address protection and key-controlled protection apply to the same store accesses, except that: low-address protection does not apply to storing performed by the channel subsystem, whereas key-controlled protection does; and key-controlled protection does not apply to tracing, the second operand of Test Block, or instructions that operate specifically on the linkage stack, whereas low address protection does.

Because fetch-protection override and low address protection do not apply to an address space for which the private-space control is one in the address-space-control element, locations 0-2047 and 4096-4607 in the address space are usable the same as the other locations in the space.

Suppression-on-Protection

Some instruction definitions specify that the operation is suppressed if a protection exception due to any type of protection is recognized. When that specification is absent, the execution of an instruction is suppressed if a protection exception due to access-list-controlled protection or DAT protection (a.k.a., page protection) is recognized, and it may be either suppressed or terminated if a protection exception due to low-address protection or key-controlled protection is recognized.

The suppression-on-protection function allows the control program to locate the segment-table entry, page-table entry, and, when enhanced DAT applies, the region-table entry used in the translation of a virtual address that caused a protection exception, in order to determine if the exception was due to DAT protection. This is used, for instance, for the implementation of the POSIX fork function (or copy-on-write function). The function also allows the control program to avoid locating the segment-table and page table entries if the address was not virtual or the exception was due to access-list-controlled protection. When enhanced DAT applies, the control program may also avoid locating the region-table entries, if the address was not virtual or the exception was due to access-list-controlled protection.

During a program interruption due to a protection exception, either a one or a zero is stored in, for instance, bit position 61 of real locations 168-175. As one example, in the z/Architecture®, the storing of a one in bit position 61 indicates that:

The unit of operation or instruction execution during which the exception was recognized was suppressed.

If dynamic address translation (DAT) was on, as indicated by the DAT-mode bit in the program old PSW, the effective address that caused the exception is one that was to be translated by DAT. (The effective address is the address which exists before any transformation by DAT or prefixing.) Bit 61 is set to zero if DAT was on, but the effective address was not to be translated by DAT because it is a real address. If DAT was off, the protection exception cannot have been due to DAT protection or access-list-controlled protection.

Bit positions 0-51 of real locations 168-175 contain bits 0-51 of the effective address that caused the exception. If DAT was on, indicating that the effective address was to be translated by DAT, bit positions 62 and 63 of real locations 168-175, and real location 160, contain the same information as is stored during a program interruption due to a page-translation exception—this information identifies the address space containing the protected address. Also, bit 60 of real locations 168-175 is zero if the protection exception was not due to access-list-controlled protection or is one if the exception was due to access-list controlled protection. A one in bit position 60 indicates that the exception was not due to DAT protection. If DAT was off, the contents of bit positions 60, 62, and 63 of real locations 168-175, and the contents of real location 160, are unpredictable. The contents of bit positions 52-59 of real locations 168-175 are unpredictable.

Bit 61 being zero indicates that the operation was either suppressed or terminated and that the contents of the remainder of real locations 168-175, and of real location 160 are unpredictable.

Bit 61 is set to one if the protection exception was due to access-list-controlled protection or DAT protection. Bit 61 may be set to one if the protection exception was due to low-address protection or key controlled protection.

If a protection-exception condition exists due to either access-list-controlled protection or DAT protection, but also exists due to either low-address protection or key-controlled protection, it is unpredictable whether bit 61 is set to zero or one.

The suppression-on-protection function is useful in performing the POSIX fork function, which causes a duplicate address space to be created. The following discussion pertains to when enhanced DAT does not apply, or when enhanced DAT applies, but the format-control (FC) bit in the segment-table entry is zero. When forking occurs, the control program causes the same page of different address spaces to map to a single page frame of real storage as long as a store in the page is not attempted. Then, when a store is attempted in a particular address space, the control program assigns a unique page frame to the page in that address space and copies the contents of the page to the new page frame. This last action is sometimes called the copy-on-write function. The control program sets the DAT-protection bit to one in the page-table entry for a page in order to detect an attempt to store in the page. The control program may initially set the DAT-protection bit to one in a segment-table entry to detect an attempt to store anywhere in the specified segment. When enhanced DAT applies, and the format control (FC) bit in the segment-table entry is one, a similar technique may be used to map a single segment frame of absolute storage.

Bit 61 being one in real locations 168-175 when DAT was on indicates that the address that caused a protection exception is virtual. This indication allows programmed forms of access register translation and dynamic address translation to be performed to determine whether the exception was due to DAT protection as opposed to low-address or key-controlled protection.

The results of suppression on protection are summarized in the table below:

| Exception Conditions | | | Presented Fields If Bit 61 One | | | |
|---|---|---|---|---|---|---|
| LA or Key-Cont. Prot. | DAT | ALC or Page Prot. | Eff Addr. | Bit 61 | Bits 62, 63 and Loc. 160 | Bit 60 |
| No | On | Yes | Log. | 1 | P | 1A |
| Yes | On | Yes | Log. | U1 | P | 1A |
| Yes | Off | No | Log. | U2 | U3 | U3 |
| Yes | Off | No | Real | U2 | U3 | U3 |
| Yes | On | No | Log. | U2 | P | 0 |
| Yes | On | No | Real | OR | — | — |

Explanation:

— Immaterial or not applicable.

OR Zero because effective address is real.

1A One if bit 61 is set to one because of access-list-controlled protection; zero otherwise.

ALC Access-list-controlled.

LA Low-address.

Log. Logical.

P Predictable.

U1 Unpredictable because low-address or key-controlled protection may be recognized instead of access-list-controlled or page protection.

U2 Unpredictable because bit 61 is only required to be set to one for access-list-controlled or page protection.

U3 Unpredictable because DAT is off.

Enhanced Suppression on Protection

When the enhanced suppression-on-protection function is installed, there are the following additional constraints on what may occur during a protection exception. These constraints take precedence over any constraints defined in the original suppression-on-protection function.

During a program interruption due to a protection exception, bit 61 of real locations 168-175 indicates the type of protection exception recognized. Bit 61 is set to one if the protection exception was due to access-list-controlled protection or DAT protection. Bit 61 is set to zero if the protection exception was due to low-address protection or key-controlled protection.

If a protection-exception condition exists due to either access-list-controlled protection or DAT protection, but also exists due to either low-address protection or key-controlled protection, it is unpredictable which exception is recognized and whether bit 61 is set to zero or one. However, while it is unpredictable which exception is recognized, the recognized exception produces consistent behavior, as summarized in the below table:

| Exception Type | DAT | Bit 61 | Bit 60 | Bits 62, 63 and Loc. 160 | Bits 0-51 |
|---|---|---|---|---|---|
| LAP | Any | 0 | — | — | — |
| KCP | Any | 0 | — | — | — |
| ALCP | On | 1 | 1 | AS | A |
| DATP | On | 1 | 0 | AS | A |

Explanation:

A Bits 0-51 of the effective address that caused the exception.

ALCP Access-list-controlled protection.

AS Identifies the address space containing the effective address that caused the exception.

DATP DAT protection.

KCP Key-controlled protection.

LAP Low-address protection.

— Undefined.

The SOP and ESOP facilities are provided for a native architecture, as well as in interpretative execution mode.

In the z/Architecture®, suppression-on-protection in the interpretive-execution mode is used to handle protection exceptions when an exception control (e.g., ECA.18) is one; and enhanced suppression-on-protection in the interpretive-execution mode is used for behavior when an exception control (e.g., ECA.18) is one and the enhanced suppression-on-protection facility is installed. In this example, ECA.18 is the protection-interception control, and in general, if a bit in ECA is zero, the associated condition results in interception, and if a bit in ECA is one, interpretive execution of the associated function is attempted by the machine.

Further, in one example, an execution control (e.g., ECB.6) is the host-protection-interruption control. In general, if a bit in ECB is zero, the associated condition results in interception, and if a bit in ECB is one, interpretive execution of the associated function is attempted. Enhanced suppression-on-protection in the interpretive-execution mode is used for the handling of host page protection exceptions when ECB.6 is one and the enhanced suppression-on-protection facility is installed.

A protection exception may result in a program interruption interception depending on the values of ECA.18, ECB.6, and IC.2 (an interception control). Other program interruptions cause interception with, for instance, an interception code 08, if they are of a type for which the corresponding interception control, bit 1 or bit 2, is set to one. With interception code 08, interception is mandatory, in one example, for guest program interruptions caused by, for instance, these exceptions: addressing, specification, and special operation.

A guest addressing exception may be due to an invalid guest or host address.

A guest protection exception may be due to a guest protection condition, a host page-protection condition, or in a given mode (e.g., MCDS—Multiple Control Data Spaces), a host access-list controlled protection condition.

The parameters of the interruption are placed in the state description.

Guest accesses to guest storage, in the various modes of interpretive execution, are subject to key-controlled storage protection as defined natively, using the real-machine storage keys. Guest accesses are also subject to guest low-address protection, guest page protection, guest fetch-protection override, and guest access-list-controlled protection. Host low-address protection is not applied to guest references to guest storage.

In addition, host page protection applies to pageable-storage-mode-guest references, as does host access-list-controlled protection in the MCDS mode.

In general, disallowed storing causes a protection exception to be recognized, which results in a guest or host program interruption. However, store access to the first 4K-byte block of the guest prefix area is checked on entry to the interpretive-execution mode, and any access exception encountered during this test results in validity interception (e.g., VIR code 0037 hex). Subsequently, during interpretive execution, an access exception condition encountered on access to the first 4K-byte block of the guest prefix area may be presented normally, or may result in a validity interception. If an access exception condition encountered by a reference to the guest prefix area to perform a guest interruption results in validity interception, then the following information may be lost:

Interruption information to be stored in the guest prefix area. (However, the guest PSW prior to the interruption is stored in the state description.)

The interruption request itself, if applicable.

The host page-protection and access-list-controlled-protection mechanisms are taken into consideration when the condition code is set during the interpretive execution of a guest Test Protection instruction, described below.

Further details regarding SOP and ESOP in interpretative execution mode are described below.

Suppression-on-Protection in Interpretive-Execution Mode

The suppression-on-protection function is usable by, for instance, z/VM®, by means of host access-list-controlled protection and host page protection, for a pageable-mode DAT-off guest. A guest is DAT-off when the DAT-mode bit (e.g., bit 5 of the program-old PSW) is zero; a guest is DAT-on when the DAT mode bit is one. Host access-list-controlled protection applies to an MCDS guest (which is a DAT-off guest).

In the interpretive-execution mode, for the purpose of this suppression-on-protection definition, the effective address stored in real locations 168-175 is the guest effective address, even when the protection exception is due to host access-list-controlled protection or host page protection.

When a protection exception is caused by host access-list-controlled protection or host page protection and the guest is a DAT-off guest, then, even when the guest effective address is one that is defined to be a real (as opposed to logical) address, bit 61 is set to one, and bits 0-51 of the guest effective address are stored. In this case, bits 62 and 63 of real locations 168-175, and the contents of real location 160, properly indicate the host address space to which the exception applies if the guest is an MCDS-mode guest, or the contents of those fields are unpredictable if the guest is a non-MCDS-mode DAT-off guest. (In the latter case, it is known that the exception applies to the host primary address space.)

Without ESOP, when a protection exception is caused by host page protection and the guest is a DAT-on guest, then bit 61 is unpredictable. Host page protection is not usable with DAT-on guests because of the inability to distinguish between a DAT-on guest page-protection exception versus a host page-protection exception.

As is normal, the above references to real locations refer to guest real locations if a guest interruption occurs. If an interception occurs instead of a guest interruption, information is stored instead at corresponding locations in the state description.

As described above, ECA.18 (in the state description) is the protection interception control. When ECA.18 is zero, a protection exception results in mandatory interception. When ECA.18 is one, interception is prevented and a guest interruption occurs. ECA.18 is overridden by IC.2, which specifies, when one, that interception occurs on any program interruption. ECA.18 is retainable by the SIE state-retention assist.

Enhanced Suppression-on-Protection in Interpretive-Execution Mode

Enhanced suppression-on-protection in interpretive-execution mode is defined, for instance, for hosts running in the z/Architecture® mode and guests running in any architectural mode under hosts in the z/Architecture® mode. (In other embodiments, however, the hosts can be running in other architectural modes.)

ECA.18 and ECB.6 (in the state description) are the protection-interception and host-protection interruption controls, respectively. When ECA.18 is one and IC.2 is zero, interception is prevented for any protection exception recognized by the guest, and a guest interruption occurs. When ECA.18 is zero, protection exceptions (except host page protection exceptions when ECB.6 is one) result in mandatory interception.

If ECB.6 is one, exceptions due to host page-protection are presented as host program interruptions. If ECB.6 is zero, host page-protection exceptions are presented as guest program interruptions or interceptions, as governed by ECA.18 and IC.2. In the case of a host interruption due to host page protection, the following occurs:

The guest unit of operation or guest instruction execution during which the exception was recognized is nullified.

The Start Interpretive Execution instruction is suppressed.

Information is stored in host storage as though it were a normal exception in the host. The address stored in the translation-exception ID is the host virtual address, and the ASCE ID and exception access ID identify the host address space. (For a non-MCDS guest, this is the host primary space.)

Interception prevention due to ECA.18 is overridden by IC.2, which specifies, when one, that interception occurs, instead of a guest program interruption. However, if both ECB.6 and IC.2 are one, host page-protection exceptions are still presented as host interruptions (that is, the ECB.6=1 treatment takes precedence over the IC.2=1 treatment). ECA.18 and ECB.6 are retainable by the SIE state-retention assist.

When a guest protection exception is caused by host access-list-controlled protection or host page protection and the guest is in the MCDS mode, then, even when the guest effective address is defined to be a real (as opposed to a logical) address, bit 61 of guest real locations 168-175 is set to one, bits 0-51 of the guest effective address are stored, and bits 62 and 63 and the contents of real location 160 properly indicate the host address space to which the exception applies. When a protection exception due to host page protection is recognized in a non-MCDS guest and host-protection interruption is disabled (that is, ECB.6 is zero), then bit 61 of guest real locations 168-175 is set to zero, and the remaining fields are undefined.

Further details regarding SOP and ESOP are described with reference to FIGS. 8A-8B, in which one embodiment of SOP/ESOP guest processing is described, in accordance with an aspect of the present invention.

Figure 8A:
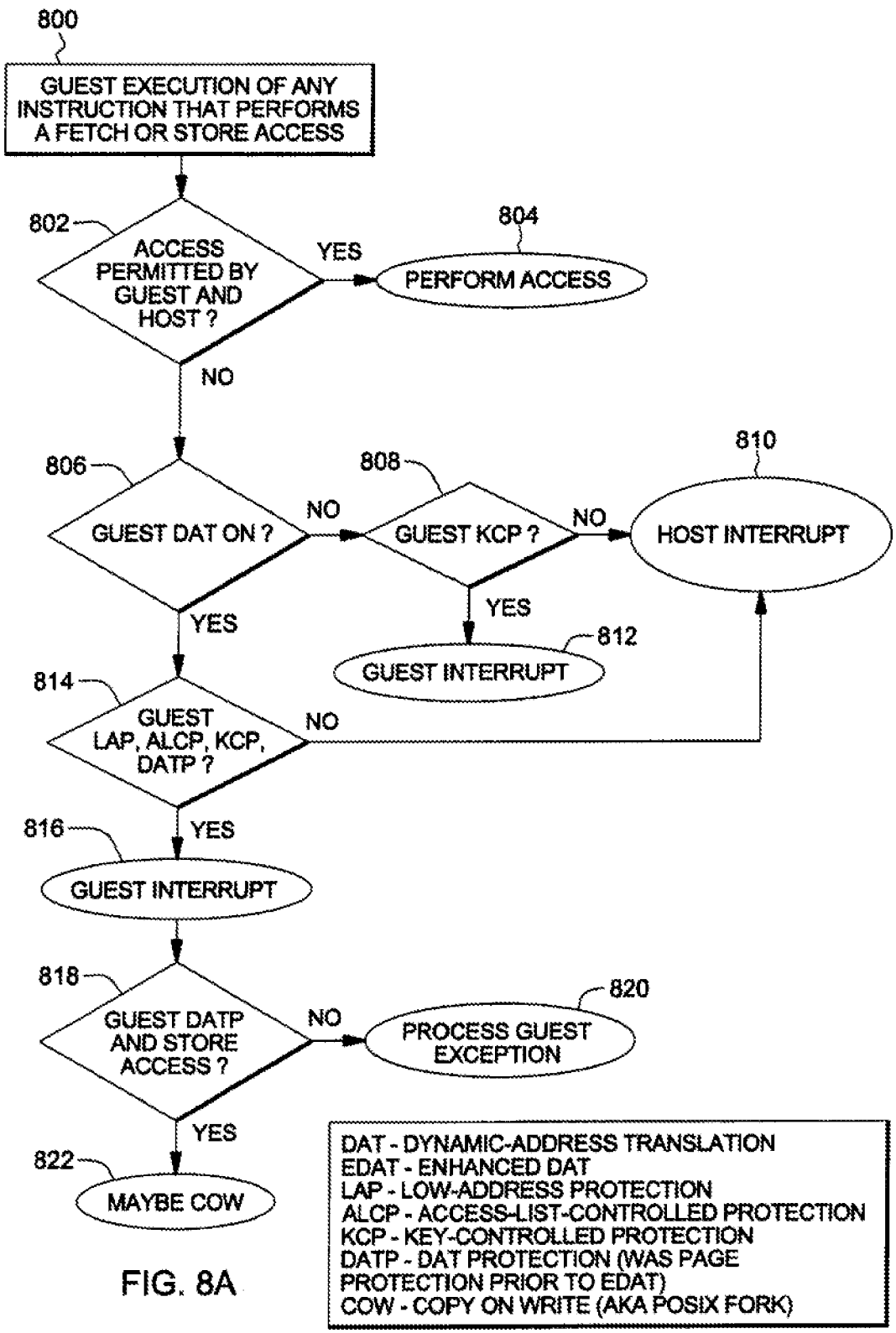
FIGS. 8A-8B depict one embodiment of guest processing logic in an environment that supports suppression on protection and enhanced suppression on protection facilities, in accordance with an aspect of the present invention.
Figure 8B:
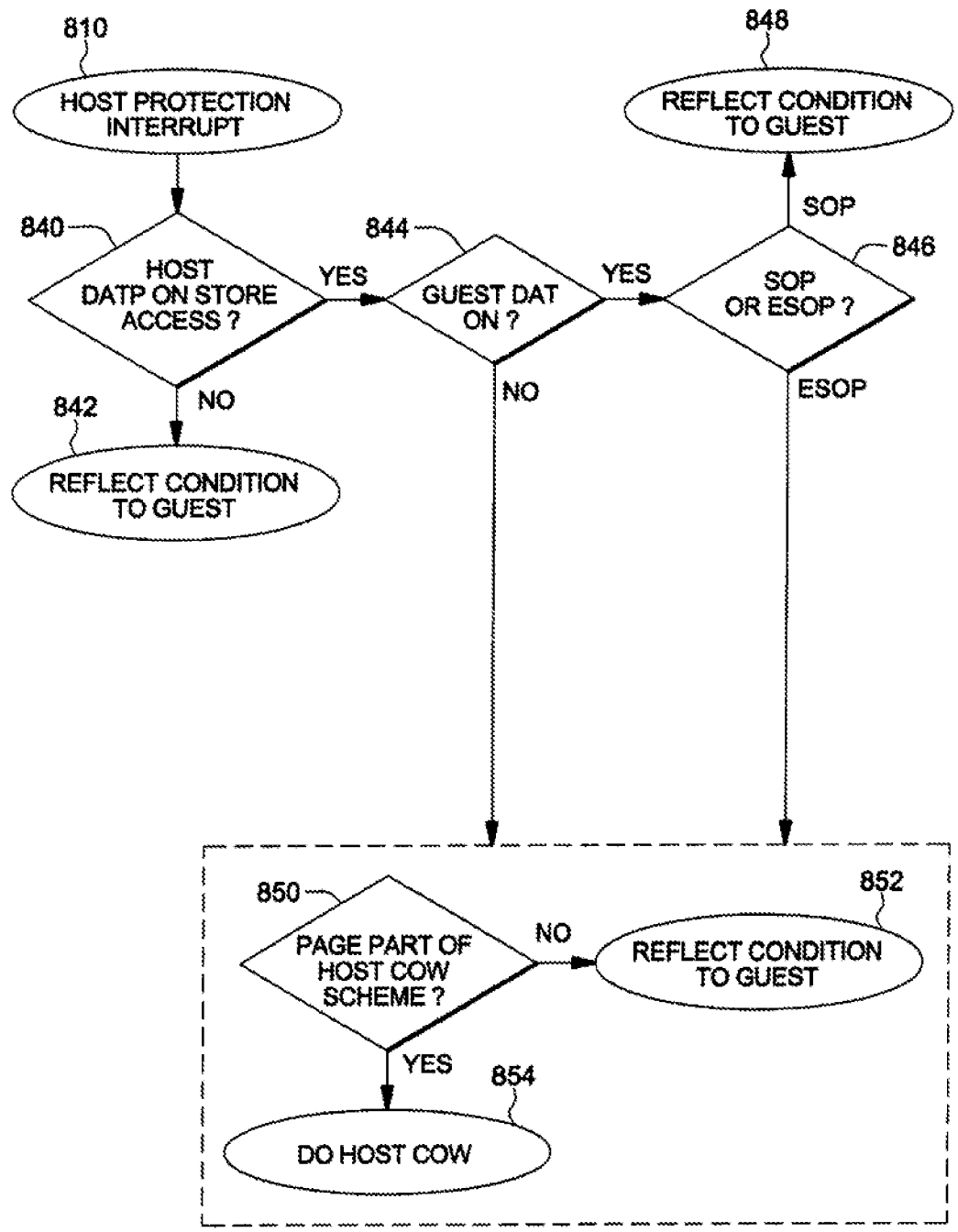

Referring initially to FIG. 8A, entry to this logic is based on a guest instruction, issued by a pageable guest executing within the environment, that attempts to perform a fetch or store access at a storage location, STEP 800. In response to a request for storage access, a determination is made as to whether the requested access (e.g., fetch or store) is permitted by the guest and the host, INQUIRY 802. In this example, the access is attempted, and if successful, the access is performed and the instruction completes, STEP 804. However, if the attempted access fails, then processing continues to determine whether it was host level protection or guest level protection that caused the access to fail.

If the access is not permitted, a determination is made as to whether DAT processing is on for the guest (a.k.a., DAT-on guest), INQUIRY 806. If the guest is not operating under translation (i.e., it is a DAT-off guest), then a further inquiry is made as to whether key controlled protection is set for the guest, INQUIRY 808. In this example, for a DAT-off guest, there still may be guest key controlled protection of a real storage block. If there is no guest key controlled protection, then it is not a guest-level protection denying access, but instead, a host level protection. Thus, a host interrupt is provided, as described below, STEP 810.

Returning to INQUIRY 808, if there is guest key controlled protection, then a guest interrupt is presented, STEP 812. This indicates to the guest that it tried to access a location that the guest indicated was protected.

Referring again to INQUIRY 806, if DAT is on for the guest, then a further inquiry is made as to whether there are other protection forms that may also apply including, for instance, low address protection, access list controlled protection, key controlled protection or DAT protection (also known as page protection prior to enhanced DAT). If none of these other protection forms apply, then it is a host problem (i.e., a host level protection causing access to fail), and thus a host interrupt is presented, STEP 810. However, if one of these other protection forms apply, then a guest interrupt is provided, STEP 816.

Further, if a guest protection scheme applies, a determination is made as to whether it is guest DAT protection (DATP) that applies and whether the request is for a store access, INQUIRY 818. If not, then a guest exception is processed, STEP 820. In one example, the supervisor (e.g., host) performs whatever processing is needed or desired, as determined by policy, when a guest receives one of these protection conditions.

Returning to INQUIRY 818, if it is a guest DATP and a store access, then possibly, the guest operating system understands copy-on-write at the guest level, STEP 822. If there is no copy-on-write notion, then a guest exception may be performed.

Further details regarding handling the host interrupt are described with reference to FIG. 8B. Initially, a determination is made as to whether the protection interrupt is due to a host DATP on a store access, INQUIRY 840. If not, then the condition is reflected to the guest, STEP 842. In one example, the host performs whatever actions are necessary to indicate to the guest the particular condition causing the fault.

Referring again to INQUIRY 840, if it is a host DATP on a store access, then a determination is made as to whether it is a DAT-on guest, INQUIRY 844. Should it be a DAT-on guest, then a further inquiry is made as to whether SOP or ESOP processing is controlling, INQUIRY 846. If it is SOP processing, then the condition is reflected to the guest, STEP 848. However, if it is ESOP processing, then bit 61 in the translation exception identification (TED) is predictable for the store access attempt that encountered the DATP condition. Without ESOP, guest DAT-on leads to the reflect to guest conclusion.

If the guest DAT is off, INQUIRY 844, or if the guest DAT is on and it is ESOP, INQUIRY 846, then the following occurs. A determination is made as to whether the storage area to be accessed (e.g., page) is part of the host copy-on-write scheme, INQUIRY 850. If not, then the condition is reflected to the guest, STEP 852. However, if it is part of the host copy-on-write scheme, then the host copy-on-write is performed, STEP 854.

Advantageously, ESOP provides the means by which a host and a guest know what is going on for a storage (e.g., page) fault and who gets blamed. The ESOP facility provides the ability of the machine (e.g., CPU) to discern guest from host page protection when operating interpretively. Previously, page protection could not be distinguished from being blamed on guest vs. host page fault. That is, a page-protection exception could be either guest or host and some unpredictability existed. Thus, the host could not do much with it. With ESOP, the prior unpredictability is eliminated and a host page-protection causes a host program interruption with information about the host bad page (e.g., failing host address). Similarly, a guest page-protection produces a guest program interruption with information about the guest page (e.g., failing guest address).

Previously, a host COW could be performed only for a guest that the host program knew was a DAT-off guest (e.g. CMS, MCDS) because for a DAT-off guest, the page protection must have been a host matter. For a DAT-on guest, however, it was unclear whether the page protection was a host or guest matter, and therefore, COW could not be used.

In accordance with an aspect of the present invention, this has changed. The enhanced suppression-on-protection (ESOP) facility enables a distinction to be made between host-level protection and guest level protection, and therefore, enables the use of COW, when appropriate. With ESOP, the additional function allows the distinction to be made so that even under circumstances of interception for a DAT-On guest (that might have tripped over its own protected page), sufficient information is available to tell the host whose exception it is, and to still perform copy-on-write, when it does belong to the host.

Test Protection

In accordance with an aspect of the present invention, a capability is provided that enables testing for protection exceptions. As one example, a Test Protection (TPROT) instruction is used to provide to a program executing the TPROT instruction information about storage to be used by the program. For instance, it provides indications about the protections of the storage and allows distinctions to be made between host level protections and guest level protections. TPROT takes advantage of ESOP, in accordance with one or more aspects of the present invention.

To further explain, when a program allocates a storage frame, frequently, it will execute a query command to learn if the frame has attributes allowing access by the program (i.e., is it resident, is it not write-protected). As examples, in IBM® System Z® processors, the TEST Protection instruction is used for this purpose, and in Sun Microsystems, a mincore( ) system call is used. By issuing the instruction or call, the program learns the attributes of the frame through a condition code in the former, and a return code in the latter. When the program issuing the storage query command is executing interpretively as a guest under the control of a host hypervisor, the return code may reflect the attributes of the frame from the viewpoint of the guest address translation tables, as well as the host address translation tables. Such behavior may expose the effects of using a particular host storage control scheme, such as copy-on-write to the guest, thus compromising the isolation provided by a hypervisor.

As described herein, the copy-on-write (COW) scheme is used to reduce memory pressure by operating systems. As processor performance increases, so too does the ability to run multiple programs under the control of a single operating system, and multiple operating systems under the control of a single hypervisor. To accommodate a larger number of simultaneous programs, special measures are implemented to manage system memory requirements.

One of these measures is the use of COW. When a program is started by the operating system, its initially allocated storage frames are marked as write-protected, and are physically shared with other programs under the control of the same OS. Then, when a store operation is attempted to one of these frames, a program exception occurs and the operating system allocates a unique frame of storage and copies in the contents of the original shared frame.

Some programs may operate successfully with a storage query command that returns the combined view of a frame's attributes at the guest and host level. However, if a program is written to avoid allocating write-protected storage, it may fail if the storage query command returns an indication of write-protection for all queried frames, having no recourse through modification of the guest's view of the frame. Such a case may occur if the hypervisor does not implement a copy-on-write scheme.

Some systems may allow guests programs to be written to use para-virtualization; guest requirements are passed to the host through a defined interface. In this case, the guest may specify directly to the host its intention of using storage and the host may respond as described above by allocating a copied frame. In such a case, the guest program is to be modified to account for the interface to each hypervisor host that it executes on. Also, the para-virtualization calls typically have a high overhead, and cause execution pressure on the hypervisor.

When an interpretively executing guest program issues a query command against a storage frame, if conditions exist such that the condition code or return code of the command would indicate the frame is write-protected solely because it is write-protected in the host address translation tables, then a program interception occurs, instead of execution completing with a condition code or return code indication that reflects the state of the host address translation table.

In accordance with an aspect of the present invention, certain host storage management techniques, such as copy-on-write, operate transparently to a guest program. It allows program logic to rely on the result of a storage query command to reflect only the guest view of a frame's storage attributes. In the case that a page is write-protected only in the guest address translation tables, the guest will learn of it without having to go through a system call or through communication with the hypervisor.

In one example, the Test Protection (TPROT) instruction takes a frame address as an input operand, and completes with one of the following four return codes:
 0 Fetching permitted; storing permitted
 1 Fetching permitted; storing not permitted
 2 Fetching not permitted; storing not permitted
 3 Translation not available.

In accordance with an aspect of the present invention, a facility is provided for executing a Test Protection (TPROT) instruction such that certain benefits are provided including, but not limited to, distinguishing between host level and guest level protection; and providing a false return code that indicates execution completed successfully, although the translation tables are not updated to accommodate COW. In this embodiment, a hypervisor sets a state value (ECB.6) for a guest image of a logical partition; a guest program of the guest image fetches the TPROT instruction for execution, the TPROT instruction specifying a memory location to be tested; the TPROT instruction tests the memory location for protection (store); responsive to the state value indicating no-suppression, performing any of setting a condition code based on a test, or performing an exception operation; or responsive to the state value indicating suppression, performing responsive to the test indicating a condition code should be set, suppressing execution of the instruction; and performing an interception of the instruction.

The execution of a Test Protection instruction by a pageable-mode guest is suppressed and a host interruption is recognized (instead of setting condition code 1) when all of the following are true, in one example:
  The enhanced-suppression-on-protection facility is installed in the host.
  ECB.6 is one.
  Conditions exist which call for condition code 1 to be set.
  A host page-protection-exception condition exists.
  Neither an access-list-controlled-protection exception nor a guest page-protection exception condition exists.

During a storage reference, when a guest page protection condition is encountered, a condition code of 1 is set by the guest unless condition code 2 is set because of key-controlled storage protection, and no action is taken by the host. For a host page protection, execution by the guest is suppressed and an instruction interception is recognized, if the conditions specified above are true, and no action is taken by the host.

Figure 9:
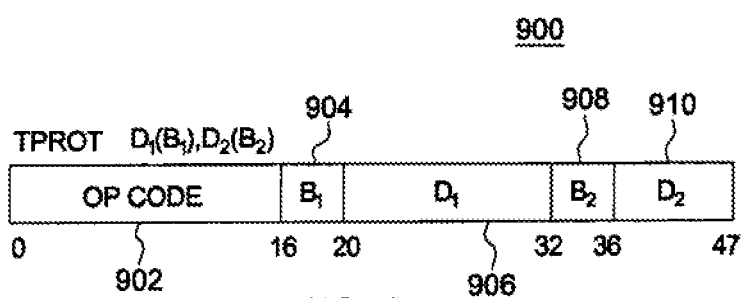
FIG. 9 depicts one example of a format of a Test Protection instruction, in accordance with an aspect of the present invention.

One example of a format of the TPROT instruction is described with reference to FIG. 9. As depicted, a TPROT instruction 900 includes, for instance, an opcode 902 (e.g., E501) identifying the TPROT instruction; a first register field ($B_1$) 904 and a first displacement field ($D_1$) 906; and a second register field ($B_2$) 908 and a second displacement field ($D_2$) 910. A first operand address is determined by adding the contents of the $D_1$ field to the contents of a register identified by the $B_1$ field. Likewise, a second operand address is formed by adding the contents of the $D_2$ field with the contents of a register specified by the $B_2$ field.

In execution, the location designated by the first-operand address is tested for protection exceptions by using the access key specified by, for instance, bits 56-59 of the second operand address.

The second-operand address is not used to address data; instead, bits 56-59 of the address form the access key to be used in testing. Bits 0-55 and 60-63 of the second-operand address are ignored, in this example.

The first-operand address is a logical address. When the CPU is in the access-register mode (when DAT is on and PSW bits 16 and 17 are 01 binary), the first operand address is subject to translation by means of both the access-register-translation (ART) and the dynamic-address-translation (DAT) processes. ART applies to the access register designated by the B1 field, and it obtains the address-space-control element to be used by DAT. When DAT is on, but the CPU is not in the access-register mode, the first operand address is subject to translation by DAT. In this case, DAT uses the address-space-control element contained in control register 1, 7, or 13 when the CPU is in the primary-space, secondary-space, or home-space mode, respectively. When DAT is off, the first-operand address is a real address not subject to translation by either ART or DAT.

When the CPU is in the access-register mode and an address-space-control element cannot be obtained by ART because of a condition that would normally cause one of the exceptions shown in the following table, the instruction is completed by setting condition code 3.

| Exception Name | Cause |
| --- | --- |
| ALET specification | Access-list-entry-token (ALET) bits 0-6 not all zeros |
| ALEN translation | Access-list entry (ALE) outside list or invalid (bit 0 is one) |
| ALE sequence | ALE sequence number (ALESN) in ALET not equal to ALESN in ALE |
| ASTE validity | ASN-second-table entry (ASTE) invalid (bit 0 is one) |
| ASTE sequence | ASTE sequence number (ASTESN) in ALE not equal to ASTESN in ASTE |
| Extended authority | ALE private bit not zero, ALE authorization index (ALEAX) not equal to extended authorization index (EAX), and secondary bit selected by EAX either outside authority table or zero |

When the access register contains 00000000 hex or 00000001 hex, ART obtains the address-space-control element from control register 1 or 7, respectively, without accessing the access list. When the $B_1$ field designates access register 0, ART treats the access register as containing 00000000 hex and does not examine the actual contents of the access register.

When ART is completed successfully, the operation is continued through the performance of DAT.

When DAT is on and the first-operand address cannot be translated because of a condition that would normally cause one of the exceptions shown in the following table, the instruction is completed by setting condition code 3.

| Exception Name | Cause |
| --- | --- |
| ASCE type | Address-space-control element (ASCE) being used is a region-second-table designation, and bits 0-10 of first-operand address not all zeros; ASCE is a region-third table designation, and bits 0-21 of first-operand address not all zeros; or ASCE is a segment-table designation, and bits 0-32 of first-operand address not all zeros. |
| Region first translation | Region-first-table entry outside table or invalid. |
| Region second translation | Region-second-table entry outside table or invalid. |
| Region third translation | Region-third-table entry outside table or invalid. |
| Segment translation | Segment-table entry outside table or invalid |
| Page translation | Page-table entry invalid |

When translation of the first-operand address can be completed, or when DAT is off, the storage key for the block designated by the first-operand address is tested against the access key specified in bit positions 56-59 of the second-operand address, and the condition code is set to indicate whether store and fetch accesses are permitted, taking into consideration the applicable protection mechanisms. Thus, for example, if low-address protection is active and the first-operand effective address is in the range 0-511 or 4096-4607, then a store access is not permitted. Access-list-controlled protection, page protection, storage-protection override, and fetch-protection override also are taken into account.

The contents of storage, including the change bit, are not affected. Depending on the model, the reference bit for the first-operand address may be set to one, even for the case in which the location is protected against fetching.

When the CPU is in the access-register mode, an addressing exception is recognized when the address used by ART to fetch the effective access list designation or the ALE, ASTE, or authority-table entry designates a location which is not available in the configuration.

When DAT is on, an addressing exception is recognized when the address of the region-table entry or entries, segment-table entry, or page-table entry or the operand real address after translation designates a location which is not available in the configuration. Also, a translation-specification exception is recognized when a region-table entry or the segment-table entry or page-table entry has a format error. When DAT is off, only the addressing exception due to the operand real address applies, in this example.

For all of the above cases, the operation is suppressed.
Resulting Condition Code:
0 Fetching permitted; storing permitted
1 Fetching permitted; storing not permitted
2 Fetching not permitted; storing not permitted
3 Translation not available
Program Exceptions:
Addressing (effective access-list designation, access-list entry, ASN-second-table entry, authority-table entry, region-table entry, segment-table entry, page-table entry, or operand 1).
Privileged operation.
Translation specification.

Test Protection permits a program to determine the protection attributes of an address passed from a calling program without incurring program exceptions. The instruction sets a condition code to indicate whether fetching or storing is permitted at the location designated by the first-operand address of the instruction. The instruction takes into consideration the protection mechanisms in the machine: e.g., access-list controlled, page, key-controlled, low address protection, storage-protection override, and fetch-protection override. Additionally, since ASCE-type, region-translation, segment-translation, and page-translation-exception conditions may be a program substitute for a protection violation, these conditions are used to set the condition code rather than cause a program exception. When the CPU is in the access-register mode, Test Protection additionally permits the program to check the usability of an access-list entry token (ALET) in an access register without incurring program exceptions. The ALET is checked for validity (absence of an ALET-specification, ALEN-translation, and ALE-sequence exception condition) and for being authorized for use by the program (absence of an ASTE-validity, ASTE-sequence, and extended-authority exception condition).

The approach using Test Protection has the advantage of a test which does not result in interruptions; however, the test and use are separated in time and may not be accurate if the possibility exists that the storage key of the location in question can change between the time it is tested and the time it is used.

In the handling of dynamic address translation, Test Protection is similar to Load Real Address in that the instructions do not cause ASCE-type, region-translation, segment-translation, and page-translation exceptions. Instead, these exception conditions are indicated by means of a condition-code setting. Similarly, access-register translation sets a condition code for certain exception conditions when performed during either of the two instructions. Conditions which result in condition codes 1, 2, and 3 for Load Real Address, result in condition code 3 for Test Protection. The instructions also differ in several other respects. The first-operand address of Test Protection is a logical address and thus is not subject to dynamic address translation when DAT is off. The second operand address of Load Real Address is a virtual address which is translated.

Access-register translation applies to Test Protection when the CPU is in the access-register mode (DAT is on), whereas it applies to Load Real Address when PSW bits 16 and 17 are 01 binary regardless of whether DAT is on or off. When condition code 3 is set because of an exception condition in access-register translation, Load Real Address, but not Test Protection, returns in a general register the program-interruption code assigned to the exception.

Condition code 3 does not necessarily indicate that the first-operand location will always be inaccessible to the program; rather it merely indicates that the current conditions prevent the instruction from determining the protection attributes of the operand. For example, in a virtual storage environment, condition code 3 may be set if the storage location has been paged out by the operating system. If the program attempts to access the location, the operating system may resolve the page-translation exception and subsequently make the location accessible to the program. Similarly, condition code 1 does not necessarily indicate that the address cannot ever be stored into. In an operating system that implements a Posix fork function, page protection is used to alert the operating system of a copy-on-write event. Following the operating-system resolution of the copy-on-write event, the program may be given store access to the location.

Figure 10A:
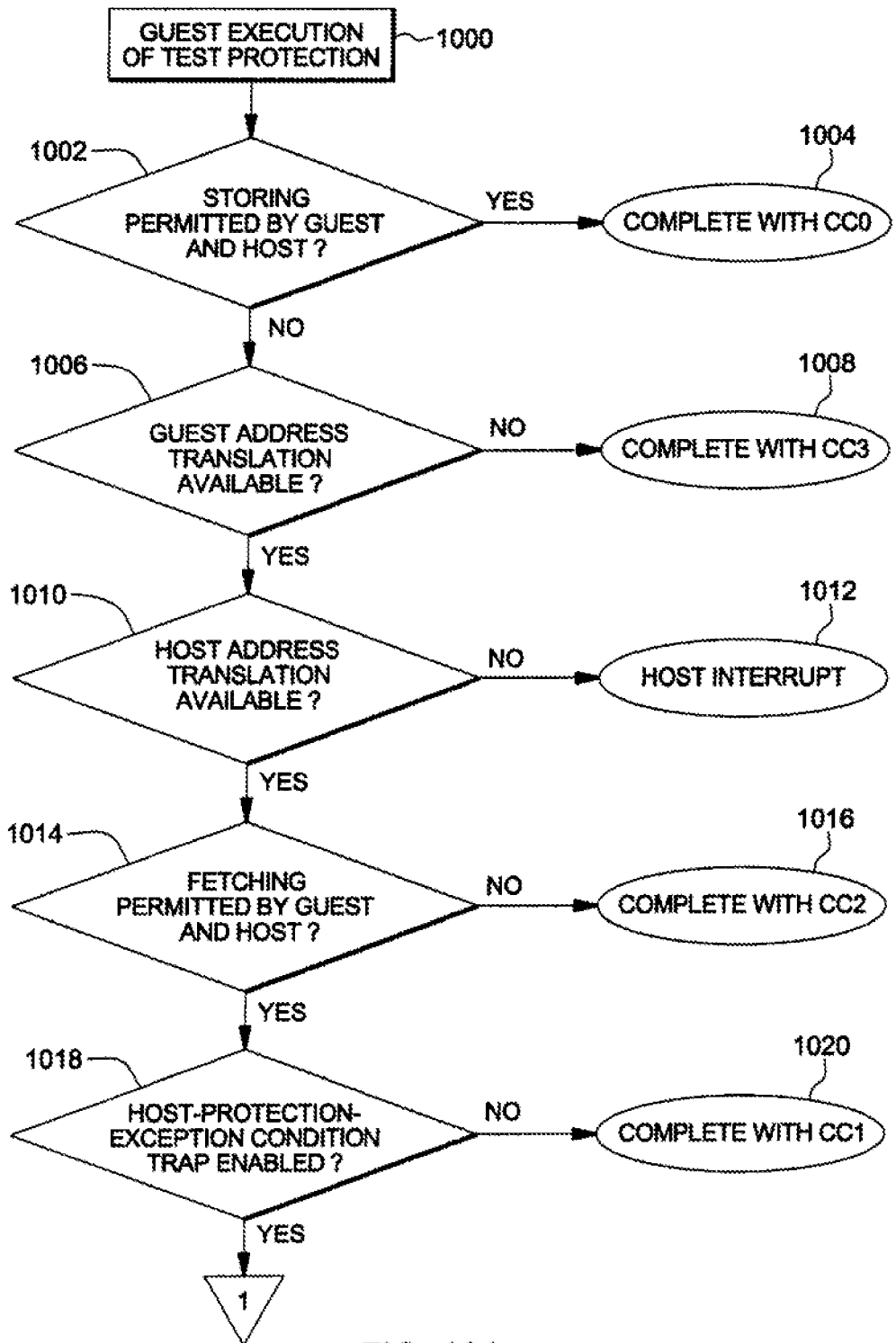
FIGS. 10A-10B depict one embodiment of the logic of the Test Protection instruction, in accordance with an aspect of the present invention.
Figure 10B:
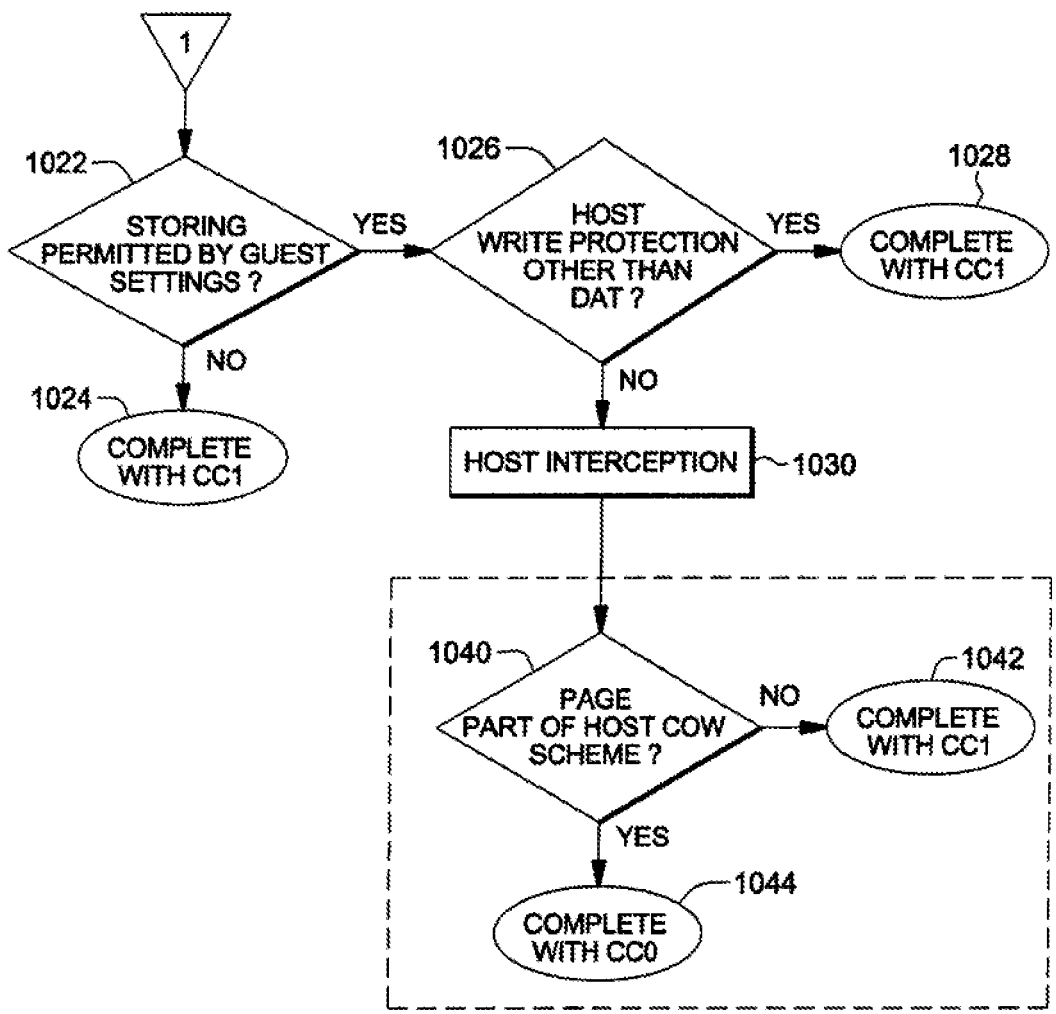

One embodiment of the logic associated with executing a Test Protection instruction, in accordance with an aspect of the present invention, is described with reference to FIGS. 10A-10B. Initially, a guest executes the Test Protection instruction in order to learn information about the storage being queried by the Test Protection instruction, STEP 1000. During execution, a determination is made as to whether a store is permitted by the guest and the host, INQUIRY 1002. In one example, this determination is made by testing whether the store could occur, although the store does not actually occur. For instance, various permissions and tests are checked with the address of the store, but the store is not performed. If the store would be successful, if performed, then the storing is considered permitted by both the guest and the host. Thus, the query instruction completes with a successful condition code (e.g., zero), STEP 1004.

However, if storing is not permitted by the guest, the host or both, then a further inquiry is made as to whether guest address translation is available, INQUIRY 1006. As examples, if the guest is a DAT-off guest, then translation is available in the sense that the identity is the translated address. However, if the guest is a DAT-on guest, one or more guest translation tables are searched to see if the corresponding entry is valid. If it is valid, then the guest address translation is available for the DAT-on guest. If guest address translation is unavailable, then the Test Protection instruction completes with a condition code indicating this situation (e.g., CC=3), STEP 1008.

If guest address translation is available, a further determination is made as to whether host address translation is available, INQUIRY 1010. This determination is made similarly to determining whether the guest address translation is available. However, for a DAT-on host, the DAT translation tables are used, instead of the guest translation tables. If host address translation is unavailable, then a host interrupt is executed, STEP 1012. In one example, the guest exits and there is a host exception routine that is invoked in order to manage the situation.

If both guest address translation and host address translation are available, then a further determination is made as to whether fetching is permitted by the guest and host, INQUIRY 1014. In one example, this determination is made based on the permissions stored at the DAT tables. If fetching is not permitted by both the guest and the host, then the instruction completes with a selected condition code (e.g., CC=2), STEP 1016. If fetching is permitted by both the guest and the host, then a further determination is made as to whether the host protection exception condition trap is enabled, INQUIRY 1018. In one example, the host protection exception condition, which is an aspect of the present invention, is enabled when ESOP is enabled and ECB.6 is on. If the host protection exception condition trap is not enabled, then the instruction completes with a selected condition code (e.g., CC=1), STEP 1020. Without the trap enabled, no special distinction is made between guest and host, nor between DAT and other types of store protection.

If the host protection exception condition trap is enabled, then a further determination is made as to whether storing is permitted by the guest settings, INQUIRY 1022. In one example, this determination is made by checking the settings set by the guest in, for instance, translation tables (e.g., guest DAT table) and/or other data structures such as those that include the protections set by the guest. If storing is not permitted, then the instruction completes with a selected condition code (e.g., CC=1), STEP 1024. However, if storing is permitted by the guest, then a further determination is made as to whether the host write protection is other than DAT, INQUIRY 1026. If so, then the instruction completes with a specified condition code (e.g., CC=1), STEP 1028. However, if only host DAT protection exists, then a host interception is provided, STEP 1030.

At this point, the TPROT instruction is simulated by the host, STEP 1032. That is, when guest execution of an instruction causes an interception to the host, the host program modifies the guest environment so that when the guest program is restarted (by the host), it appears to the guest that the intercepted instruction has executed. During the simulation, a determination is made as to whether the area in storage to be accessed (e.g., page) is part of the host COW scheme, INQUIRY 1040. If the page is not part of the host COW scheme indicating that it cannot be written to, then a selected completion code is provided (e.g., CC=1), STEP 1042. However, if the page is part of the host COW scheme, then TPROT issues with the successful completion code (e.g., CC=0), STEP 1044.

In accordance with an aspect of the present invention, with this successful condition code, the host does not change the state of its DAT tables. The frame remains write-protected. In a host COW scheme, when the guest actually stores to the frame, a host interruption will occur (e.g., via ESOP) and the host exception routine will perform the COW. This "false" return code is an advantage of one aspect of the invention in that when TPROT is issued against a block that is never stored to, performing the COW is avoided.

In one embodiment, a protection query instruction (e.g., TPROT) is provided, in which when the protection setting in the host table is fetch protected, a host interrupt occurs. However, when the protection setting in the guest table is fetch protected, a condition code is returned.

As one example, if the TPROT instruction is interpretively executed, and if it would complete with CC=1 only because the frame is write-protected within the host view (i.e., in the host address translation table) and not in the guest view (i.e., in the guest address translation table), then a host interception occurs. While handling the interception, if the host is implementing a copy-on-write (COW) storage control scheme and if the frame is truly available to be modified by a guest program, a copy will be made of the frame, the host address translation tables will be updated, and guest execution will continue with the TPROT instruction completing with CC=0.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 11:
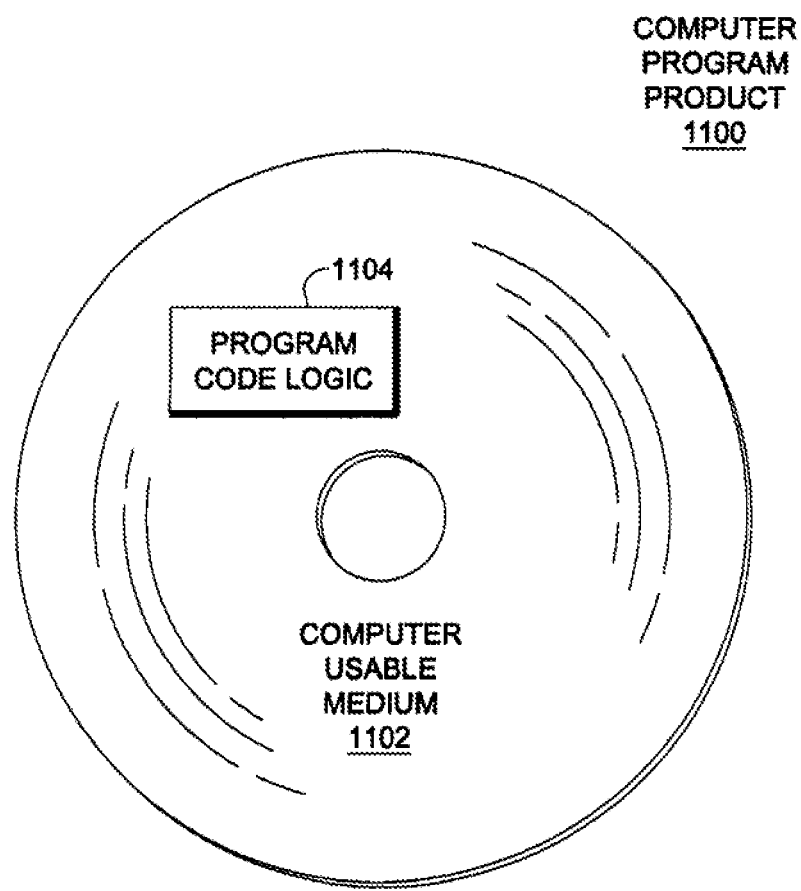
FIG. 11 depicts one embodiment of a computer program product incorporating one or more aspects of the present invention.

One example of an article of manufacture or a computer program product incorporating one or more aspects of the present invention is described with reference to FIG. 11. A computer program product 1100 includes, for instance, one or more computer usable media 1102 to store computer readable program code means or logic 1104 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Commercial Implementation

Although the z/Architecture® by IBM® is mentioned herein, one or more aspects of the present invention are equally applicable to other machine architectures and/or computing environments employing pageable entities or similar constructs.

Commercial implementations of the TPROT instruction, facilities, and other formats, instructions, and attributes disclosed herein can be implemented either in hardware or by programmers, such as operating system programmers, writing in, for example, assembly language. Such programming instructions may be stored on a storage medium intended to be executed natively in a computing environment, such as a z/Architecture® IBM® server, or alternatively in machines executing other architectures. The instructions can be emulated in existing and in future IBM® servers and on other machines or mainframes. They can be executed in machines where generally execution is in an emulation mode.

In emulation mode, the specific instruction being emulated is decoded, and a subroutine is built to implement the individual instruction, as in a subroutine or driver, or some other technique is used for providing a driver for the specific hardware, as is within the skill of those in the art after understanding the description hereof. Various software and hardware emulation techniques are described in numerous United States patents including: U.S. Pat. Nos. 5,551,013, 5,574,873, 5,790,825, 6,009,261, 6,308,255, and 6,463,582, each of which is hereby incorporated herein by reference in its entirety. Many other teachings further illustrate a variety of ways to achieve emulation of an instruction format architected for a target machine.

In addition to the above, further details regarding guest processors and related processing is described in U.S. Pat. No. 7,197,585 entitled "Method and Apparatus for Managing the Execution of a Broadcast Instruction on a Guest Processor," Farrell et al., issued Mar. 27, 2007, which is hereby incorporated herein by reference in its entirety.

Other Variations and Architectures

While various examples and embodiments are described herein, these are only examples, and many variations are included within the scope of the present invention. For example, the computing environment described herein is only one example. Many other environments, including other types of communications environments, may include one or more aspects of the present invention. For instance, different types of processors, guests and/or hosts may be employed. Further, pageable hosts, as well as pageable guests, may use one or more aspects of the present invention. Moreover, other types of architectures can employ one or more aspects of the present invention.

Aspects of the invention are beneficial to many types of environments, including environments that have a plurality of zones, and non-partitioned environments. Further, there may be no central processor complexes, but yet, multiple processors coupled together. Various aspects hereof are applicable to single processor environments.

Further, in the examples of the data structures and flows provided herein, the creation and/or use of different fields may include many variations, such as a different number of bits; bits in a different order; more, less or different bits than described herein; more, less or different fields; fields in a differing order; different sizes of fields; etc. Again, these fields were only provided as an example, and many variations may be included. Further, indicators and/or controls described herein may be of many different forms. For instance, they may be represented in a manner other than by bits. Additionally, although the term address is used herein, any designation may be used.

As used herein, the term "page" is used to refer to a fixed-size or predefined-size area of virtual storage (i.e., virtual memory). As one example, a host page is an area of host virtual storage. The size of the page can vary, although in the examples provided herein, a page is 4K bytes. Further, a "frame" is used to refer to a fixed-size or predefined size area of real or absolute storage (i.e., memory). As examples, a host frame is an area of host real or absolute storage, and a guest frame is an area of guest real or absolute storage. In the case of a pageable guest, this guest real or absolute storage is mapped by host virtual storage. As is common, pages of host virtual storage are backed by frames of host real or absolute storage, as needed. The size of the frame can vary, although in the examples provided herein, a frame is 4K-bytes or 1M-bytes. However, in other embodiments, there may be different sizes of pages, frames, segments, regions, blocks of storage, etc. Moreover, in other architectures, the terms "page" and "segment" may be used interchangeably or the term "page" may be used to apply to multiple size units of virtual storage. The term "obtaining", such as obtaining an instruction, includes, but is not limited to, fetching, having, receiving, being provided, creating, forming, issuing, etc. An instruction can reference other registers or can reference other than registers, such as operands, fields, locations, etc. Many other alternatives to the above are possible. Further, although terms, such as lists, tables, etc. are used herein, any types of data structures may be used. For instance, a table can include other data structures as well. Again, those mentioned herein are just examples.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for facilitating management of storage of a computing environment, the computer program product comprising:
    at least one non-transitory computer readable storage medium readable by at least one processing circuit and storing instructions for performing a method comprising:
        attempting access to a storage location by an instruction issued by a guest of the computing environment, the storage location being protected by at least one type of storage protection;
        detecting, based on the attempting access to the storage location, that the attempted access of the storage location failed due to a fault of a storage protection of the at least one type of storage protection protecting the storage location, wherein the storage protection is a host level of protection or a guest level of protection;
        determining, based on one or more checks, whether the detected failure of the attempted access is due to the host level of protection or the guest level of protection, wherein the determining comprises checking whether translation processing is on for the guest, and depending on whether translation processing is on for the guest, checking one or more other guest protections to determine whether the detected failure of the attempted access is due to the host level of protection or the guest level of protection; and
        performing an action based on the determining, wherein the action performed is one action based on the detected failure of the attempted access being due to the guest level of protection and is another action based on the detected failure of the attempted access being due to the host level of protection.

2. The computer program product of claim 1, wherein the method further comprises obtaining information relating to the detected failure of the attempted access, the information comprising a host address based on the determining indicating that the detected failure of the attempted access is due to the host level of protection.

3. The computer program product of claim 1, wherein the method further comprises obtaining information relating to the detected failure of the attempted access, the information comprising a guest address based on the determining indicating that the detected failure of the attempted access is due to the guest level of protection.

4. The computer program product of claim 1, wherein the method further comprises performing a guest interrupt, based on the determining indicating that the detected failure of the attempted access is due to the guest level of protection.

5. The computer program product of claim 1, wherein the method further comprises performing a host interrupt, based on the determining indicating that the detected failure of the attempted access is not due to the guest level of protection.

6. The computer program product of claim 1, wherein the one action comprises indicating that storing is not permitted by the guest level of protection.

7. The computer program product of claim 1, wherein the storage location is at least part of an area of storage that specifies a first frame of host main storage, and wherein the other action comprises:
    based on determining that the area of storage is part of a host copy-on-write scheme, assigning a second frame to the area of storage, copying contents of the first frame to the second frame, and permitting guest storing to the area of storage comprising the second frame; and
    based on determining that the area of storage is not part of the host copy-on-write scheme, indicating that storing is not permitted by the host level of protection.

8. The computer program product of claim 1, wherein the failure of the attempted access is detected during execution of a pageable guest of the computing environment attempting access to the storage location.

9. The computer program product of claim 8, wherein the pageable guest is of one architecture and is executed by a host of another architecture different from the one architecture.

10. A computer system for facilitating management of storage of a computing environment, the computer system comprising:
    a memory; and
    a processor in communication with the memory, wherein the computer system is configured to perform a method, said method comprising:
        attempting access to a storage location by an instruction issued by a guest of the computing environment, the storage location being protected by at least one type of storage protection;
        detecting, based on the attempting access to the storage location, that the attempted access of the storage location failed due to a fault of a storage protection of the at least one type of storage protection protecting the storage location, wherein the storage protection is a host level of protection or a guest level of protection;

determining, based on one or more checks, whether the detected failure of the attempted access is due to the host level of protection or the guest level of protection, wherein the determining comprises checking whether translation processing is on for the guest, and depending on whether translation processing is on for the guest, checking one or more other guest protections to determine whether the detected failure of the attempted access is due to the host level of protection or the guest level of protection; and performing an action based on the determining, wherein the action performed is one action based on the detected failure of the attempted access being due to the guest level of protection and is another action based on the detected failure of the attempted access being due to the host level of protection.

11. The computer system of claim 10, wherein the failure of the attempted access is detected during execution of a pageable guest of the computing environment attempting access to the storage location.

12. The computer system of claim 10, wherein the method further comprises obtaining information relating to the detected failure of the attempted access, the information comprising a host address based on the determining indicating that the detected failure of the attempted access is due to the host level of protection.

13. The computer system of claim 10, wherein the method further comprises obtaining information relating to the detected failure of the attempted access, the information comprising a guest address based on the determining indicating that the detected failure of the attempted access is due to the guest level of protection.

14. The computer system of claim 10, wherein the method further comprises performing a guest interrupt, based on the determining indicating that the detected failure of the attempted access is due to the guest level of protection.

15. The computer system of claim 10, wherein the method further comprises performing a host interrupt, based on the determining indicating that the detected failure of the attempted access is not due to the guest level of protection.

16. A computer-implemented method of facilitating management of storage of a computing environment, the computer-implemented method comprising:

attempting access to a storage location by an instruction issued by a guest of the computing environment, the storage location being protected by at least one type of storage protection;

detecting, based on the attempting access to the storage location, that the attempted access of the storage location failed due to a fault of a storage protection of the at least one type of storage protection protecting the storage location, wherein the storage protection is a host level of protection or a guest level of protection;

determining, based on one or more checks, whether the detected failure of the attempted access is due to the host level of protection or the guest level of protection, wherein the determining comprises checking whether translation processing is on for the guest, and depending on whether translation processing is on for the guest, checking one or more other guest protections to determine whether the detected failure of the attempted access is due to the host level of protection or the guest level of protection; and performing an action based on the determining, wherein the action performed is one action based on the detected failure of the attempted access being due to the guest level of protection and is another action based on the detected failure of the attempted access being due to the host level of protection.

17. The computer-implemented method of claim 16, wherein the method further comprises performing a host interrupt, based on the determining indicating that the detected failure of the attempted access is not due to the guest level of protection.

18. The computer-implemented method of claim 16, further comprising obtaining information relating to the detected failure of the attempted access, the information comprising a host address based on the determining indicating that the detected failure of the attempted access is due to the host level of protection.

19. The computer-implemented method of claim 16, further comprising obtaining information relating to the detected failure of the attempted access, the information comprising a guest address based on the determining indicating that the detected failure of the attempted access is due to the guest level of protection.

20. The computer-implemented method of claim 16, further comprising performing a guest interrupt, based on the determining indicating that the detected failure of the attempted access is due to the guest level of protection.

* * * * *